(12) United States Patent
Brown et al.

(10) Patent No.: US 7,859,571 B1
(45) Date of Patent: Dec. 28, 2010

(54) SYSTEM AND METHOD FOR DIGITAL VIDEO MANAGEMENT

(75) Inventors: Alexander James Brown, Earlwood (AU); Alexander Stephen Baburin, Curl Curl (AU)

(73) Assignee: Honeywell Limited, New South Wales (AU)

( * ) Notice: Subject to any disclaimer, the term of this patent is extended or adjusted under 35 U.S.C. 154(b) by 716 days.

(21) Appl. No.: 10/049,449

(22) PCT Filed: Aug. 14, 2000

(86) PCT No.: PCT/AU00/00967

§ 371 (c)(1),
(2), (4) Date: Aug. 15, 2002

(87) PCT Pub. No.: WO01/13637

PCT Pub. Date: Feb. 22, 2001

(30) Foreign Application Priority Data

Aug. 12, 1999 (AU) .................................. PQ2173

(51) Int. Cl.
*H04N 5/232* (2006.01)
(52) U.S. Cl. .................................. 348/211.3
(58) Field of Classification Search ............. 348/211.3, 348/211.11; 386/83
See application file for complete search history.

(56) References Cited

U.S. PATENT DOCUMENTS

| | | | |
|---|---|---|---|
| 5,231,492 A * | 7/1993 | Dangi et al. ............. 348/14.12 |
| 5,623,304 A | 4/1997 | Ota et al. | |
| 5,724,475 A | 3/1998 | Kirsten | |
| 5,930,473 A | 7/1999 | Teng et al. | |
| 6,011,901 A | 1/2000 | Kirsten | |
| 6,014,706 A | 1/2000 | Cannon et al. | |
| 6,141,488 A * | 10/2000 | Knudson et al. ............... 386/83 |
| 6,144,375 A * | 11/2000 | Jain et al. ................. 715/500.1 |
| 6,275,648 B1 * | 8/2001 | Knudson et al. ............... 386/83 |
| 6,469,737 B1 * | 10/2002 | Igarashi et al. ........... 348/211.3 |
| 6,567,121 B1 * | 5/2003 | Kuno ....................... 348/211.3 |
| 6,583,813 B1 * | 6/2003 | Enright et al. .............. 348/150 |
| 6,697,103 B1 * | 2/2004 | Fernandez et al. .......... 348/143 |
| 6,868,225 B1 * | 3/2005 | Brown et al. ................... 386/83 |
| 6,965,399 B1 * | 11/2005 | Oka et al. .............. 348/211.99 |

FOREIGN PATENT DOCUMENTS

| | | |
|---|---|---|
| CA | 2237654 | 12/1998 |
| EP | 715466 A2 | 6/1996 |
| EP | 845904 A2 | 6/1998 |
| EP | 860998 A1 | 8/1998 |
| EP | 895421 A2 | 2/1999 |
| EP | 917376 A2 | 5/1999 |

* cited by examiner

*Primary Examiner*—Jason Chan
*Assistant Examiner*—Nicholas G Giles

(57) ABSTRACT

A digital video management system which provides live digital video signals from a number of cameras to a number of client terminals, via a computer communications network, in real time. The system stores live video signals in response to a video recording trigger which may be either a schedule, an event, or an operator action. The invention is particularly suitable for use in integrated security and process control environments.

15 Claims, 32 Drawing Sheets

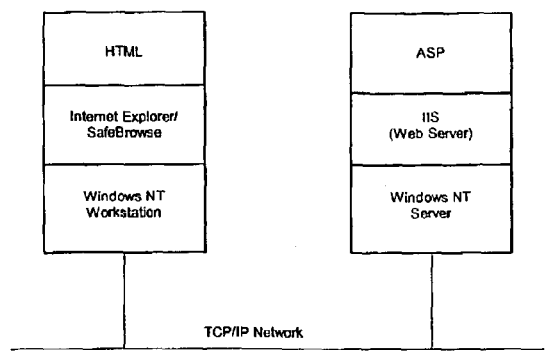
Figure 26
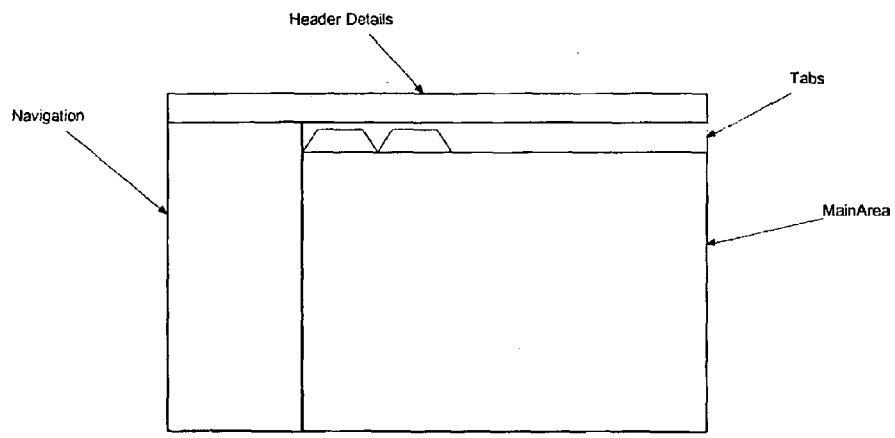
Figure 27
| Menu | Sub-Menu |
|---|---|
| Search | Basic Search |
| | Advanced Search |
| Cameras | New Camera |
| | Tree containing available cameras |
| Camera Groups | New Camera Group |
| | List of camera groups available |
Figure 28

| Function | LVL1 | LVL2 | OPER | SUPV | ENGR | MNGR |
|---|---|---|---|---|---|---|
| View Live Video | | | ✓ | ✓ | ✓ | ✓ |
| Record Live Video | | | ✓ | ✓ | ✓ | ✓ |
| Play Video | | | ✓ | ✓ | ✓ | ✓ |
| View Camera Group | | | ✓ | ✓ | ✓ | ✓ |
| View Camera Tour | | | ✓ | ✓ | ✓ | ✓ |
| Schedule recording requests | | | ✓ | ✓ | ✓ | ✓ |
| Search Video | | | ✓ | ✓ | ✓ | ✓ |
| Control PTZ of Camera | | | ✓ | ✓ | ✓ | ✓ |
| Add/Modify Camera | | | | ✓ | ✓ | ✓ |
| Add/Modify Camera Group | | | | ✓ | ✓ | ✓ |
| Add/Modify Camera Tour | | | | ✓ | ✓ | ✓ |
| Modify record settings | | | | ✓ | ✓ | ✓ |
| Modify disk configuration | | | | ✓ | ✓ | ✓ |
| Modify audit log configuration | | | | ✓ | ✓ | ✓ |
| Modify host configuration | | | | ✓ | ✓ | ✓ |
| Assign control level to cameras | | | | | | ✓ |
| Assign area to cameras | | | | | | ✓ |

Figure 38

| | |
|---|---|
| Movement | Pan<br>Tilt<br>Zoom<br>PTZ<br>ContinuousPTZ |
| Miscellaneous | Iris open/close<br>Focus near/far |
| Preset | Set preset<br>Clear preset<br>Goto preset |

SYSTEM AND METHOD FOR DIGITAL VIDEO MANAGEMENT

CROSS-REFERENCE TO RELATED APPLICATION

This is a Section 35 U.S.C. 371 application from PCT Serial No. PCT/AU00/00967, filed Aug. 14, 2000.

FIELD OF INVENTION

The present invention relates to digital video management systems, and, in particular relates to a digital video management system which provides live digital video signals from a number of cameras to a number of client terminals, via a computer communications network, in real time.

The invention has been developed primarily for use with digital cameras in integrated security and process control environments, and will be described hereinafter with reference to these applications. However, it will be appreciated that the invention is not limited to use in those fields.

BACKGROUND

The provision of streamed video data from a transmission point to viewing or monitoring computers is dominated by internet broadcasting systems. Examples of this technology include NetShow™ by the Microsoft Corporation and RealVideo™ by RealNetwork. Due to the relatively limited bandwidth presently available to most users of the internet, these broadcast systems rely strongly on the use of high level compression algorithms. Some systems rely on compression standards such as those defined by the various Motion Picture Experts Group ("MPEG") standards. In other cases, proprietary standards have been developed that better suit the compression requirements of live, or at least streamed, video.

Other fields in which streaming video, generally, has been of interest are those of industrial control and automation, and security and access control. A typical example is a casino, in which intensive surveillance can use over 1,500 cameras monitored by a team of, say, 6 operators. Currently, these highly visually intensive applications utilise analog, full bandwidth video and, as required, audio. Any recording that takes place is implemented on analog or digital video recorders, the tapes or other recording media then being archived for a predetermined length of time to ensure that they are available if required. Unfortunately, archiving of video-taped data in this way is unappealing because it requires an entire dedicated analog recording and replay system for multiple channels of video. Moreover, location and replay of a particular time or event associated with one or more cameras can be inconvenient due to the need to retrieve specific tapes and to fast forward and rewind the tapes manually to locate a particular entry points.

In addition traditional CCTV systems rely on large, expensive matrix switchers connected via expensive video cabling to bring CCTV monitoring to operators. Integration with security systems is reserved for the top end of the market. These systems have been largely inflexible because installing and commissioning a new camera or operator monitor is expensive, time consuming, and can involve significant construction works.

A significant constraint of the traditional CCTV system is the method of recording video to VCR tapes. These devices allow read and write operations, but not at the same time. So if a user wishes to view a recently recorded event they must halt any current recording and rewind the tape before being able to view the incident. The only traditional CCTV solution to this problem was a complex method of switching recording to standby VCRs that resulted in recordings being spread across several tapes.

Typical analogue systems are centred around a matrix switcher which provides camera switching and control for the system as shown in FIG. 1. There are inherent disadvantages with this architecture as follows:

Firstly, star cabling configuration using application specific coaxial cabling. This is inherently inflexible and costly in that if an additional camera or monitor is required, a dedicated cable needs to be installed that connects back to the matrix switcher.

Secondly, significant hardware real estate is required for such matrix switcher equipment.

Thirdly, such architectures provide limited recording capability which is restricted by the length of VHS tape. By way of example, a typical recording configuration would be to connect 16 cameras to a multiplexer, which in turn is connected to a video recorder that records in time lapse mode for 24 hours.

The 16-input multiplexer is capable of real time (25 fps in PAL format) recording overall. With 16 cameras being recorded simultaneously, each camera is recorded at approximately 1.5 fps, when recorded on a VCR tape in non time-lapse mode. Using a four hour VCR tape in 24 hour time lapse mode, this frame rate decreases by a factor of 4—recording is now at a rate of one frame every four seconds.

Fourthly, cameras cannot be individually configured with different recording frame rates.

Fifthly, the only way to improve the frame rate is to reduce the number of cameras or the duration of recording. This of course means either adding further VCRs (with a consequent increase in multiplexers, cost and control room real estate) or increasing the frequency of tape changes (which creates more labour for those responsible and an increase in storage space required.

Sixthly, recording and playback of a tape cannot be done simultaneously. To view a tape that is being recorded, the tape has to be stopped, rewound and played.

Finally, due to the mechanical components of a VCR, maintenance requirements are high.

A feature of streamed internet-based video is that the compression algorithms used to minimise bandwidth introduce a delay. The delay can be fixed or variable, depending upon the implementation, and can extend to many seconds in duration. Moreover, internet streaming video transmission standards usually emphasise coherency of sound at the expense of video coherence, since humans are more susceptible to information loss through interrupted speech than the loss of a few frames from full motion video. For example, both NetShow and RealVideo are tuned to give priority to the audio stream over the video stream. This is ideal for content such as news broadcasts, where maintaining an unbroken audio stream is of greater relative importance to human comprehension than the quality of the associated video stream. However, in the security and process control field, movement can be considerably more important than sound. For example, a criminal may take less than a second to break a window. If several frames have been dropped to cope with relatively low available bandwidth, then the crime can be missed. This makes NetShow, and RealVideo and similar products designed for internet video streaming unsuitable to the security and process control markets.

Another issue is that internet broadcasting of live events does not need to be absolutely live. In particular, the audience will not be aware if an event has been delayed by a few seconds. Both NetShow and RealVideo take advantage of this fact to delay broadcast so that the respective systems can determine whether a video stream to be transmitted can further be compressed. For this reason, both products introduce a delay in the order of several seconds.

By contrast, in a process control environment, video is often used to confirm operator control. For example, an operator in a control room can use visual feedback from a video camera to enable him to remotely control pouring of steel. It will be appreciated that any delay between the event occurring and the corresponding video reaching the operator controlling the event can be dangerous.

Similar principles apply to security. A prison guard remotely opening a door needs to know immediately if an escapee is hiding behind the door. Delays of several seconds in this situation are unacceptable.

It is an object of the invention to overcome or at least substantially ameliorate one or more of the disadvantages of the prior art.

In addition, the present invention has a number of non-limiting advantages, as follows:

Firstly, it provides tight integration with Honeywell's Enterprise Buildings Integrator (EBI) software to provide significant ease-of-use. The ability to view live and recorded video from the same operator stations as used for the security management, including new and future stations is a significant advantage. The ability to use any event in the system as a trigger for video recording provides you with the ultimate in flexibility and the association of video to system alarms makes it relatively simple for the user to investigate incidents.

Secondly, it is flexible. Because the present invention transmits compressed video signals via the network it easy to move existing cameras and install new cameras. New CCTV monitors only require a PC with suitable software and a network connection.

Thirdly, it is cost-effective. By utilising industry standard TCP/IP networking, the present invention can share network structures with other corporate groups thus significantly reducing the ongoing cost of CCTV system support. This also means that the cost of adding or relocating cameras is greatly reduced since access to a network connection is generally far easier than having to install dedicated cabling back to a matrix switcher. Further, the present invention works with standard, open, PC and network components and so allows customers to choose their desired components. And since pan/tilt/zoom (PTZ) control can be performed from EBI, no costly matrix switcher is required.

Fourthly, the system is open. The present invention uses non-proprietary hardware to create an open surveillance system. This openness means that a user's initial investment is protected and that the system can be cost effectively expanded at a later date to easily handle additional cameras, incorporate new technology, or to handle changes in building use or configuration.

Fifthly, it is scalable. Because of it's revolutionary architecture, the present invention is capable of supporting both small and large installations of CCTV cameras.

Sixthly, it provides significant user security. The present invention contains operator security features previously only available in high-end security systems like Honeywell Enterprise Buildings Integrator (EBI). Security managers can therefore ensure that individual users are controlled in what they can see and what they can do.

Seventhly, the system enables intelligent recording. The combination of event activated, user activated and scheduled recording means that the user only needs to record the video they want. This not only optimises the use of their storage resources, it means that they don't need to spend endless hours searching for recorded incidents.

Eighthly, it includes an advanced search capability. The present invention's search capabilities use the latest database technologies to ensure the user can quickly find and view any incident.

Ninthly, the system provides advanced archiving so the user never loses the important data. Data is written to DAT tape or other storage media for long-term storage. Users can specify how long each individual section of video will be retained.

Tenthly, it provides smooth playback. The format of recorded video on traditional CCTV systems does not have a time base. This means that the playback speed of incidents tends to vary based on how busy the recording machine is. The recorded video will show a person walking across a field of view at a constant rate as slowing down and then hurrying. By using time indexing when storing video, the present invention is able to replay incidents as they occurred—not in fast or slow motion.

SUMMARY OF INVENTION

According to a first aspect of the present invention, there is disclosed a digital video management system including:
 a video server;
 a plurality of cameras; and
 at least one client computer terminal, all linked via a computer communications network, wherein said video server receives video signals from said cameras, and provides said video signals to said client, via said network.

Preferably, said server provides one or more of:
 (a) live video signals; and
 (b) previously recorded video signals;
to said client in real time.

Preferably, one of said cameras is a recording camera providing live video signals to said video server via said network and wherein whilst said video server is receiving those live video signals from said recording camera it simultaneously provides to any client:
 (a) live video signals from said recording camera; and
 (b) video signals which have been previously recorded from said recording camera.

According to a second aspect of the present invention, there is disclosed a method of managing digital video using a digital video management system including:
 a video server;
 a plurality of cameras; and
 at least one client computer terminal, all linked via a computer communications network, wherein said method includes the steps of:
 (a) sending video signals from said cameras to said video server;
 (b) providing said video signals from said video server to said client, via said network.

According to a third aspect of the present invention, there is disclosed a system for low-latency remote video monitoring of one or more areas or processes of interest, the system including:
 a plurality of cameras positioned respectively at or adjacent the areas or processes of interest, each of the cameras outputting a video signal;
 interface means connecting the cameras to a computer communications network, for placing the respective video signals onto the computer communications network;

a first computer server connected to a computer communications network, for accepting the video signals from the interface means; and at least one computer terminal connected to the computer communications network for selectively monitoring one or more of the video signals via the first computer server.

According to a fourth aspect of the invention there is provided a digital video management system including:

a plurality of cameras for providing respective first video signals to a computer communications network;

a video server for linking to the network, receiving the first video signals and being responsive to a predetermined schedule for storing on storage media associated with the server at least some of the first video signals, wherein the server selectively accesses the stored signals and/or the first video signals to provide second video signals;

at least one client computer terminal for linking to the network for providing the predetermined schedule and for receiving the second signals.

Preferably, the predetermined schedule includes a plurality of time based trigger points and the server stores the first images starting at a first predetermined period prior to each point and a second predetermined period after each point. More preferably, the predetermined schedule includes a plurality of event based trigger points and the server stores the first images starting at a first predetermined period prior to each point and a second predetermined period after each point. Even more preferably, the system includes a sensor for providing a third signal to the network, wherein one of the event based trigger points comprises the third signal falling within a predetermined range.

Preferably also, the predetermined schedule includes a plurality of time based trigger points and the server stores the first images starting at a first predetermined period prior to each point and a second predetermined period after each point. More preferably, the first and the second predetermined periods are configurable based upon one or more of: on a per camera basis; on a per area basis; on an event type basis.

In a preferred form, the duration of the first and the second predetermined periods are configurable.

Preferably, the system includes a plurality of client terminals and a controller for controlling the second signals that are provided to respective terminals. More preferably, the terminals provide over the network respective camera control commands to the video server and the video server processes those commands and generates control signals that are sent to the relevant camera via the network. More preferably, the processing of the commands by the video server includes a determination of whether or not the terminal sending the respective command has access rights to the relevant camera.

According to a fifth aspect of the invention there is provided a digital video management system including:

a plurality of cameras for providing respective first video signals to a computer communications network;

a video server for linking to the network, receiving the first video signals and storing on storage media associated with the server at least some of the first video signals, wherein the server is responsive to a plurality of client account records for accessing the first signals and/or the stored signals to selectively produce a plurality of second video signals; and a plurality of client computer terminals corresponding to each client access record, the terminals being linked to the network for requesting and receiving respective second signals.

Preferably, at least some of the client account records are changeable via the respective client computer terminal. More preferably, the client account records include data indicative of the one or more first signals and/or stored signals that the server is responsive to when producing the respective second signals.

Preferably also, the client account records include data indicative of one or more predetermined triggers. More preferably, the trigger is one or more of: a predetermined time; a predetermined interval; and an event. Even more preferably, the event is predicated by a transducer that provides an event signal to the video server via the network.

Other aspects and features of the invention will become apparent from reading the following detailed description of preferred embodiments in conjunction with the attached drawings.

BRIEF DESCRIPTION OF DRAWINGS

Preferred embodiments of the invention will now be described, by way of example only, with reference to the accompanying drawings, in which:

FIG. 26 is an HMI System Block diagram;

FIG. 27 is a block diagram illustrating an HMI Layout;

FIG. 28 is a table showing the preferred Menu options;

FIG. 38 is a table illustrating Security level Permissions;

FIG. 39 is a table illustrating Camera Operations;

FIG. 41 is a screen dump of a sample client display screen showing the Live Video Settings of the preferred embodiment;

FIG. 42 is a screen dump of a sample client display screen showing the Camera Recording Details of the preferred embodiment;

FIG. 46 is a screen dump of a sample client display screen showing the Advanced Search Of Recorded Video screen of the preferred embodiment;

DETAILED DESCRIPTION

Figure 2:
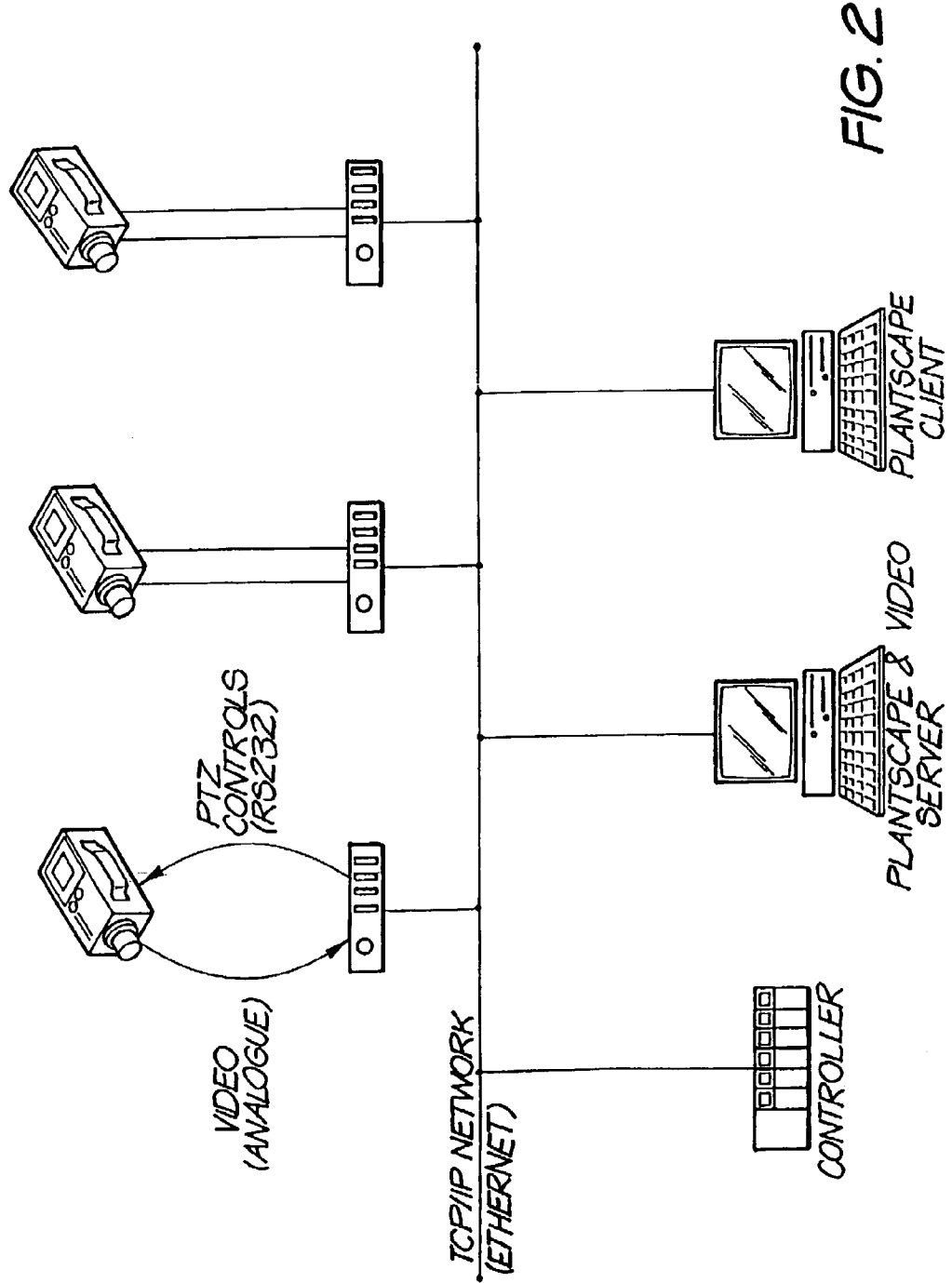
FIG. 2 shows a first embodiment of a system for low-latency remote video monitoring of one or more areas or processes of interest, in accordance with the present invention.

Referring to the drawings, and the embodiments shown in FIG. 2 in particular, a system for low-latency remote video monitoring in one or more areas or processes of interest includes a plurality of cameras 2. Each of the cameras 2 is positioned respectively at or adjacent an area or process of interest (not shown).

Interface means in the form of respective camera streamers 4 connect the cameras 2 to a computer communications network in the form of a TCP/IP network 6. In the preferred embodiment, the TCP/IP network takes the form of an ethernet connection, although any suitable local area network ("LAN"), wide area network ("WAN") or remote communications network such as the Internet can be utilised.

A first computer server, hereinafter referred to as video server 8, is connected to the TCP/IP network 6 by a means of a suitable interface. The interface can take the form of a network interface card (now shown) installed within the video server 8 to enable data to placed onto and removed from the TCP/IP network 6 by the video server 8.

Also provided is a computer terminal in the form of a client computer 10, that is also connected to the TCP/IP network 6 for communication therewith. As with the video server 8, a suitable interface means is provided to enable the client computer 10 to place data on, and remove data from, the TCP/IP network 6.

In the preferred embodiment, both the video server 8 and the client computer 10 take the form of IBM-Compatible personal computers ("PCs"). In that case, it is preferred that the video server 8 use the Microsoft NT operating system, whilst the client computer 10 can use Windows NT, Windows 9X or Windows 2000, for example. It will be appreciated that other operating platforms, such as a Sparc-stations or Macintosh computers, and different operating systems, such as Unix or the Macintosh OS can be used, depending upon the application or existing network arrangement.

The cameras 2 can be based on any suitable television format or resolution, including black and white, NTSC colour, PAL colour or S-CAM colour. Typically, the output from each camera will take the form of an analog output from the cameras, supplied directly to their respective camera streamers 4. However, cameras with compressed or uncompressed digital outputs can also be used.

Each camera streamer 4 receives the analog signal from its respective camera 2 and converts it to a predetermined digital format, which is then packetised into a suitable TCP/IP format. The packetised data is then placed onto the TCP/IP network 6.

In one embodiment, the packetised data streamed onto the TCP/IP network 6 is in a compressed format. The compression can take place in a number of ways. For example, the camera 2 itself can digitise and pre-compress the video stream, thereby to avoiding the need for the corresponding camera streamer 4 to digitise or compress the video. Alternatively, the camera streamer 4 can itself perform compression of the digitised video. The compression can be of any suitable form, including any of the MPEG standards. However, a standard that is configured specifically to smooth streaming of video data standard, is more desirable. Examples of suitable compression schemes and standards will suggest themselves to those skilled in the relevant art.

Figure 1:
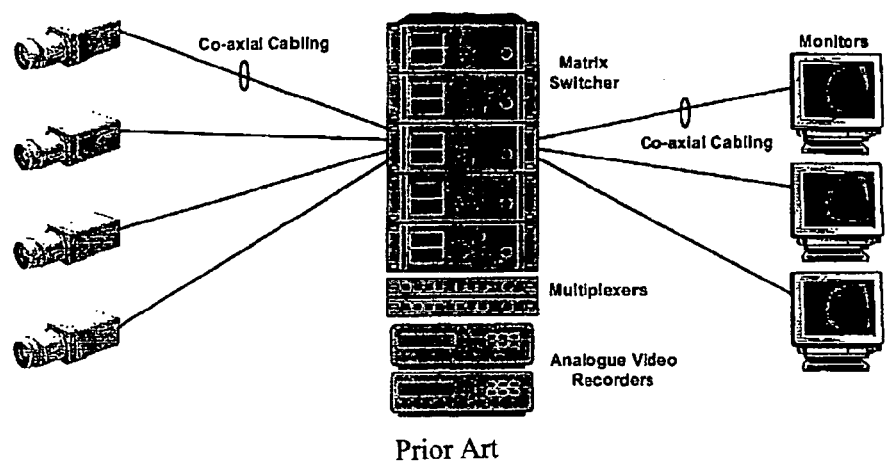
FIG. 1 is a schematic diagram showing components in a prior art analogue Closed Circuit Television ("CCTV") system.
Figure 5:
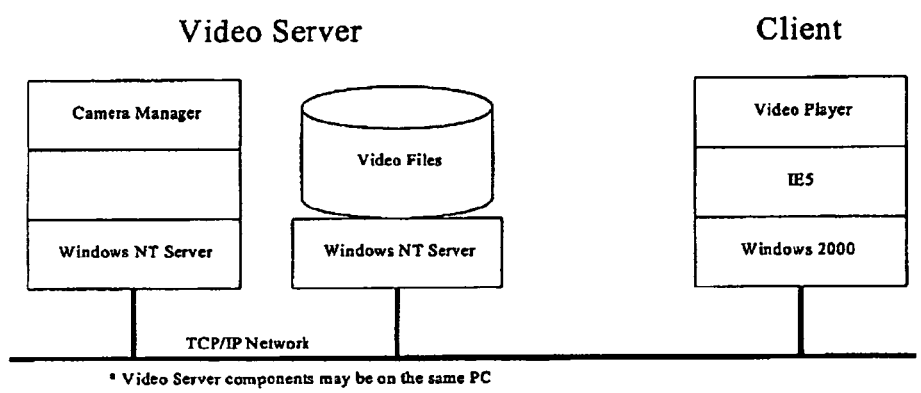
FIG. 5 is a schematic diagram showing the file structure of a video server and client, forming part of a system according to the invention.

Referring to FIG. 5, there is shown an architecture of both the video server 8 and the client computer 10. The video server 8 includes software modules including a camera manager 12, a software video player, both operating on a Windows NT server platform. In the embodiment shown, the video server 8 also includes storage means in the form of a hard disk drive 16 for storing the streamed video taken from the TCP/IP network 6. It will be appreciated that the hard disk drive 16 can either be on the same physical computer as the other software components, or can be placed on a different physical computer connected by the same TCP/IP network 6.

It will be appreciated that suitable software video players will suggest themselves to those skilled in the art.

The client computer 10 includes an operating system in the form of Windows 2000, an internet browser in the form of Internet Explorer V5 20, and a video player in the form of a software video player 22 for interfacing with Internet Explorer V5 20. It will be appreciated that many of the other features discussed in relation to the preferred embodiments are implemented in other software modules, the implementation of which will be readily appreciated by those skilled in the art.

During normal usage, each of the cameras 2 is powered up, and directed at an area or process of interest. For example, one or more of the cameras 2 can be concerned with security, and might therefore be pointed at an entrance to a building or within a foyer. Alternatively, cameras 2 can be positioned to view critical points in production processes to allow the operation thereof to be monitored.

Figure 6:
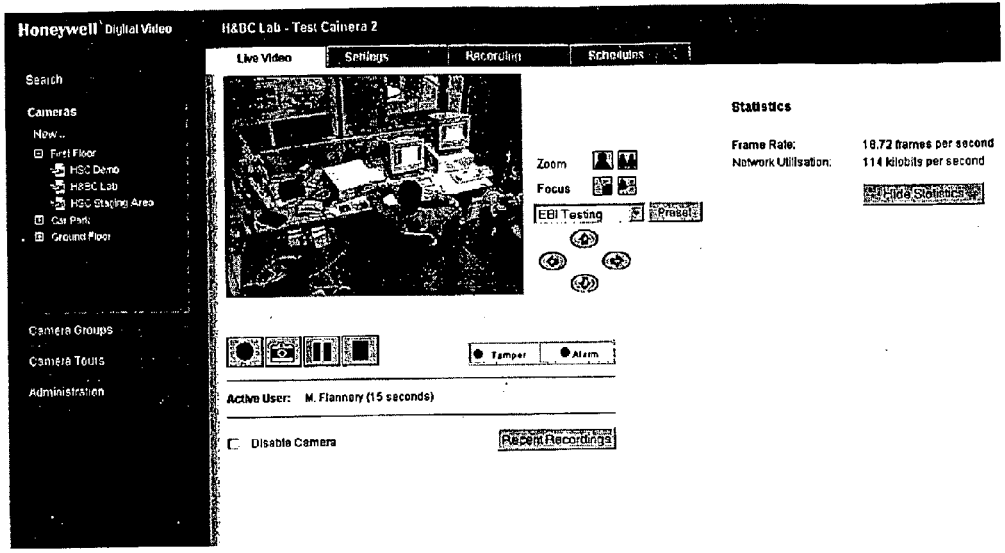
FIG. 6 is a screen dump of a sample client display screen showing a frame captured from a single camera and displayed on a client in a system according to the invention.

FIG. 6 shows a screen capture of the front end of a Human Machine Interface (HMI) client 26 running on the client computer 10. The HMI clients 26 runs in conjunction with software video player 22 with Internet Explorer 20 running on the client computer 10. Once the operator has requested live video from a particular camera 2 via the HMI client 26 a request is passed to the camera manager 12. In response to the request, the camera manager 12 broadcast a stream of live video onto the network addressed to the appropriate client computer 10. The software video player 22 receives the suitably addressed video stream from the video server 8, and displays it to the operator.

Figure 8:
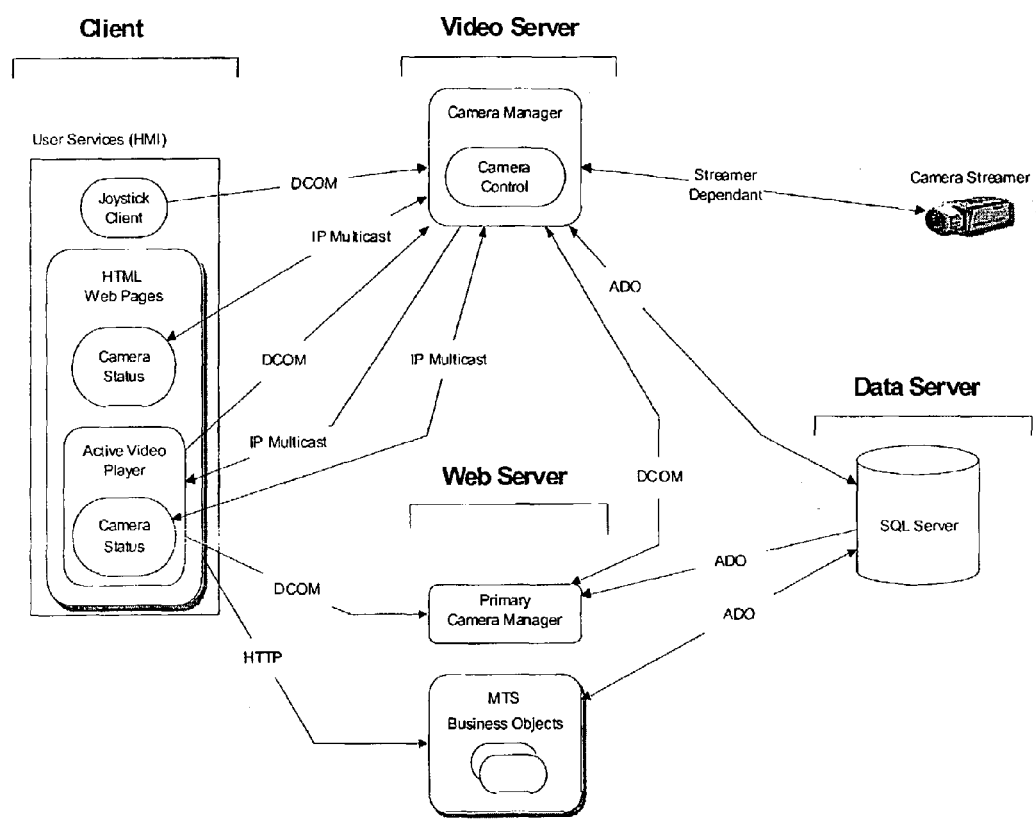
FIG. 8 is a block diagram of a system such as that shown in any of FIGS. 2 to 4, setting out the steps for viewing live camera output.

FIG. 6 shows a view presented to an operator of the HMI display of client computer 10. In this particular case, an employee at a work station. The operator is able to choose from other cameras 2 by means of a camera menu 24. FIG. 8 shows a block diagram of the control paths used whilst an operator is viewing live camera output.

In the preferred embodiment, other information regarding the video stream is sent to the software video player 22 and HMI client by the camera manager 12. For example, details such as the camera status (eg. whether the streaming video selected is currently being recorded), the operator currently in control of the camera and the expected duration for which the present operator will remain in control.

Figure 9:
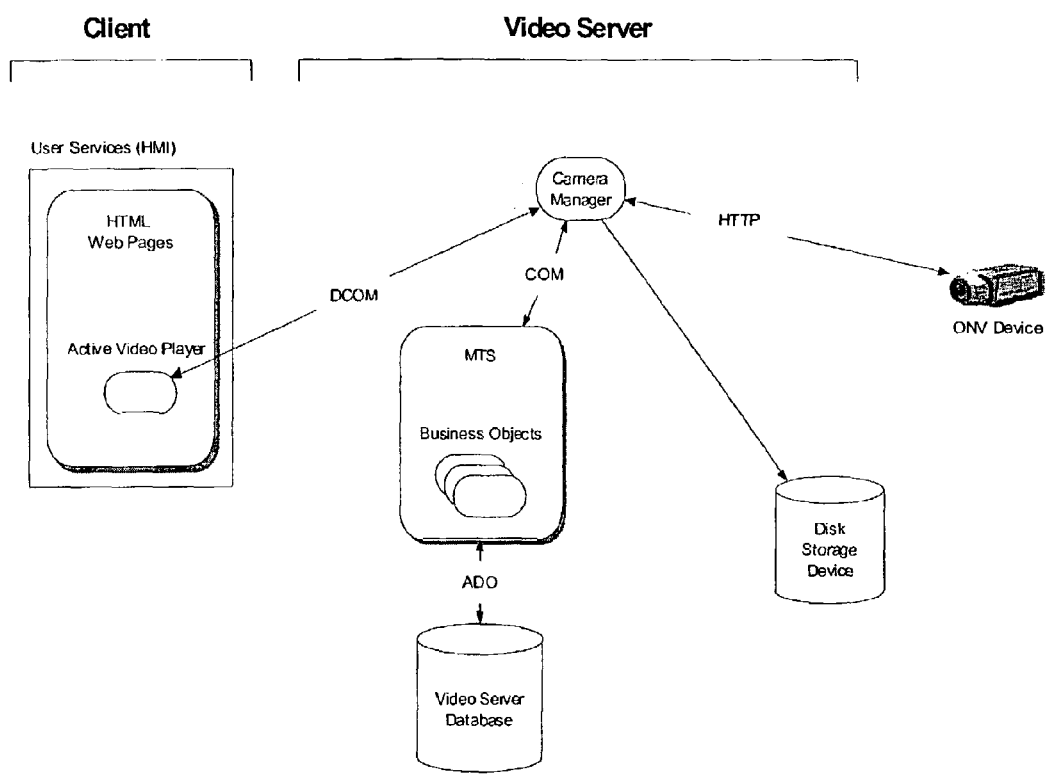
FIG. 9 shows a block diagram similar to that of FIG. 8, setting out the steps for user-activated recording.
Figure 10:
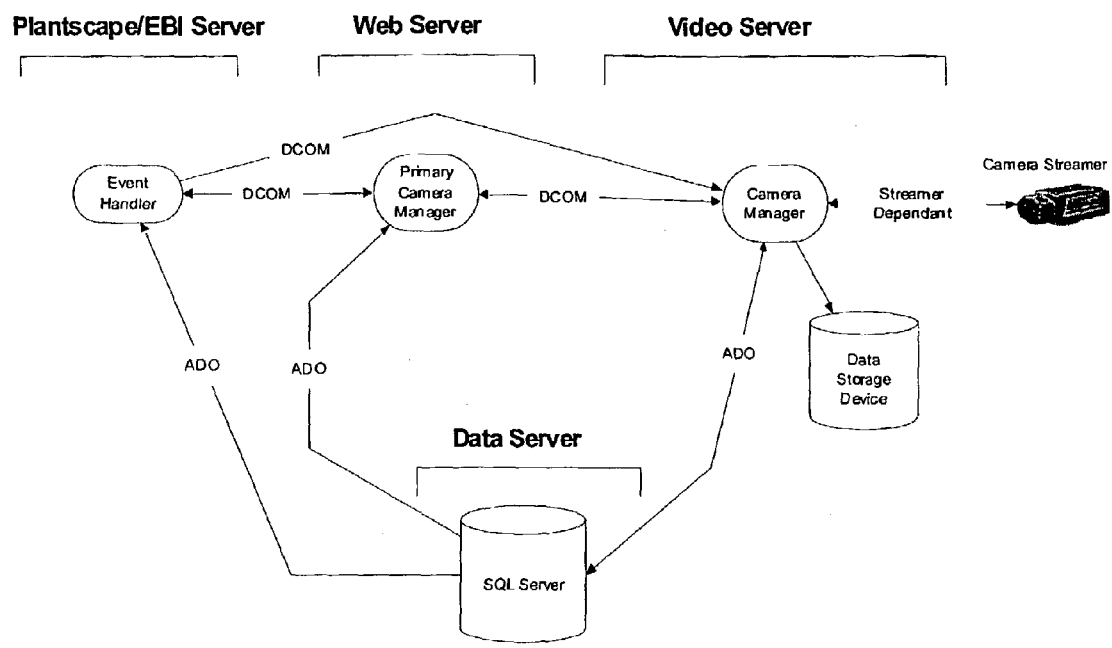
FIG. 10 shows a block diagram similar to those of FIGS. 8 and 9, setting out the steps for event-activated recording.

At an arbitrary time, usually in response to an incident shown in the streaming video, the operator can request that the currently displayed video be recorded. This is achieved by pressing the record button 28 on the front end of the HMI client 26. In response to pressing the record button 28, the software video player 22 sends a request to record video to the camera manager 12, as shown in FIG. 9. The camera manager 12 in turn causes the video stream from the active camera to be recorded onto the hard disk drive 16. In the preferred embodiment, information regarding the record request, such as the camera name, the name of the user requesting the recording and the time of recording are also written to the video server database. Once recording of the video is no longer required, the user can press the stop button 30 on the front end of the HMI client 26. Preferably, at this stage, further information such as the duration of the recorded video, is also written to the hard disk drive 16.

In a particularly preferred embodiment of the invention, and as shown in FIG. 2, one or more controllers 32 are connected to the network for communication with the system 1. The controller can take the form of, for example, an interface for one or more sensors, such as PIR detectors, smoke sensors, card readers or any other security or condition detecting transducer. The controller takes the output from the respective transducers and converts them into a suitable TCP/IP protocol to be placed on the TCP/IP network 6.

In the usual implementation of the invention, a security or process control server 34 is provided. Examples of suitable servers are the Plantscape and EBI servers, both developed and licensed by the applicant. It will be appreciated, however, that the security or process control server may need to be modified from its standard form to interface correctly with the video server. As shown in the embodiment of FIG. 2, the security or process control server 34 can share a physical computer with the video server 8. However, as shown in other embodiments such as those of FIGS. 3 and 4, the security or process control server 34 is desirably run on separate computer hardware.

The security or process control server 34 is configurable by an operator to monitor the controller 32, and any other controllers of interest. In the event of an alarm or the detection of any other event preselected by the operator of the security or process control server 34, an event handler 36 instructs the camera manager 12 on the video server 8 to commence recording. In the preferred form, the camera manager 12 has access to data setting on the association between one or more cameras 2 and the event or alarm indicated by the event handler 36. In this case, the camera manager 12 selects the appropriate camera or cameras 2 and causes the video streams they provide to the network to be recorded to the hard disk drive 16.

In each of the recording cases, it is desirable that the option be provided to set a video buffer of some predetermined length. For example, by setting, say, a ten second video buffer, recording of a particular video stream in response to either operator command or an event notification from the event handler 36 results in the recording of ten seconds worth of video prior to the recording being requested. This to enables an operator reviewing the recorded video to ascertain conditions or events prior to that causing the recording to be effected. Moreover, since the event will usually have happened immediately before recording commences, the buffer enables the event itself to be recorded for later review.

Figure 13:
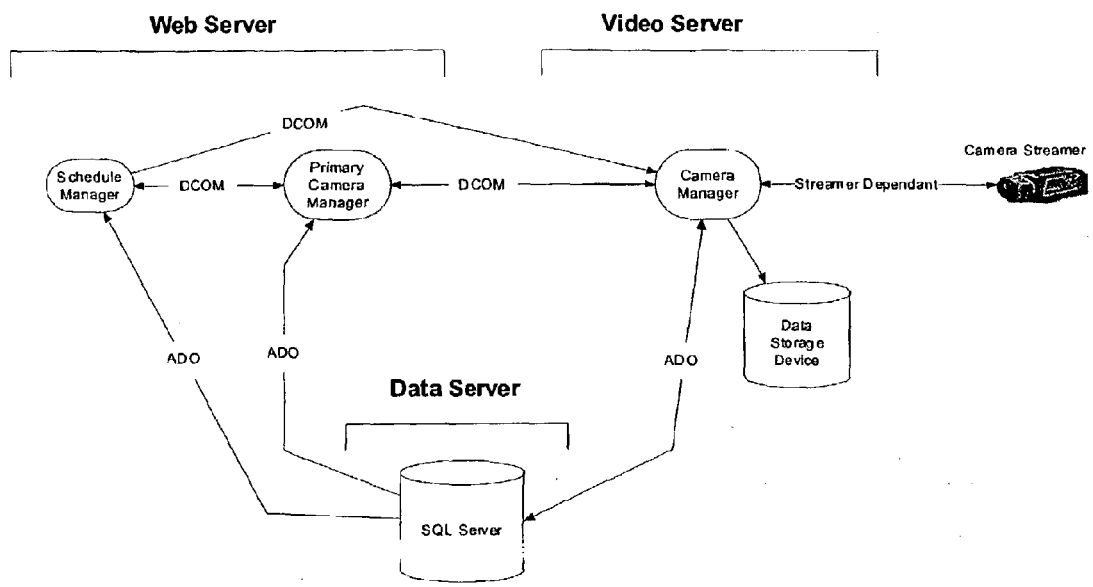
FIG. 13 is a block diagram showing the steps for implementing scheduled recordings.

Another way in which recording can take place is by means of scheduled recordings, as best shown in the block diagram of FIG. 13. An operator can schedule a record request through a schedule manager 38 accessible via the front end of the HMI client 26. The schedule manager 38 is responsible for recording the request in an appropriate form, and then requesting that the camera manager 12 commence recording at an appropriate time.

The schedule manager 38 is a process running on the video server. It polls the video server database periodically (every minute in the preferred embodiment) and caches a list of record requests for that minute. Since, in the preferred form, schedule recordings are accurate to within one minute, this list will simply contain the names of cameras 2 that require video capture. The recordal requests for these cameras 2 are sent to the camera manager 12, which writes the appropriate video streams onto hard disk drive 16. Relevant details about the recorded video will also be written onto the database by the camera manager 12, as discussed above.

Figure 14:
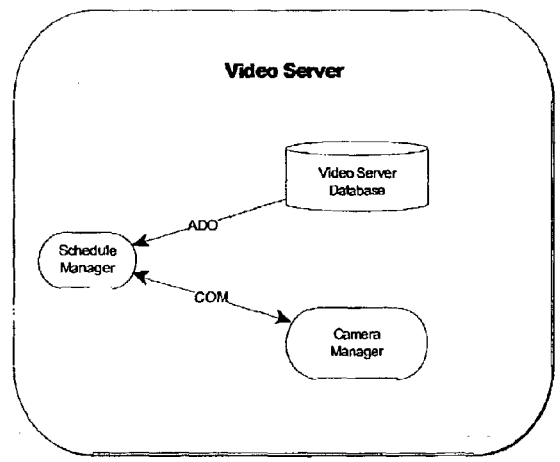
FIG. 14 is a functional diagram of a schedule manager for implementing schedule management as shown in FIG. 13.
Figure 15:
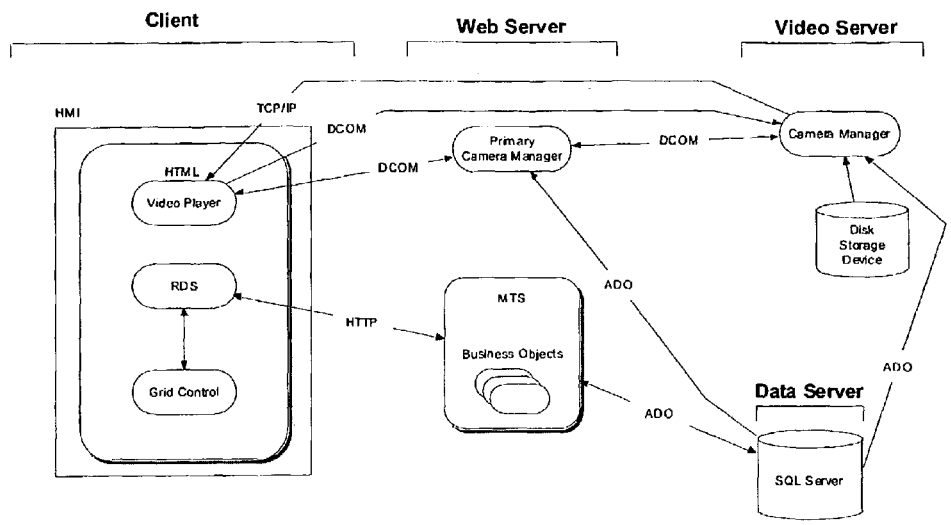
FIG. 15 is a block diagram illustrating the Viewing of Recorded Video.

FIG. 14 shows a functional diagram of the schedule manager 38. The schedule manager 38 runs as a Windows NT service, and is responsible for scheduled operations. The schedule manager has three main functions, being:
 administration and scheduled recording requests;
 scheduling archiving of video files; and
 scheduling deletion of video files from archives.

The schedule manager 38 queries the server database each minute for recording requests that occur in the current minute (or in previous minutes where they are not marked as underway or complete). The schedule manager 38 informs the camera manager 12 to start recording for each recording request due in that minute. In the preferred form, the schedule manager 38 also provides the camera manager 12 with a camera identification code, a required frame rate and a recording duration.

Each hour, the schedule manager 38 queries the database for any video files where the archived date has passed and where a "DoArchive" flag is set. The "DoArchive" flag ensures that video clips that are of immediate or on-going interest are archived, to ensure that they are available in the future. The schedule manager 38 then instructs an archive manager module 40 to archive each file in its list. The status of the file is then updated to "Archiving in Progress" until the archiving operation is complete.

Also each hour, the schedule manager 38 queries the database for any video files whose delete date has passed and for which a "DoDelete" flag is set. Again, the "DoDelete" flag ensures that only those files that are intended to be deleted are in fact removed from the database. The schedule manager 38 then requests that the archive manager 40 delete each of those files for which deletion is scheduled in the current hour.

Figure 16:
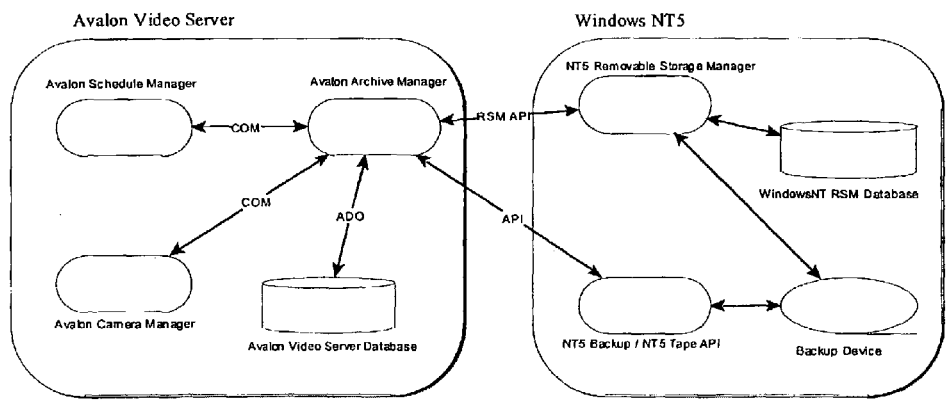
FIG. 16 is a functional diagram of an archive manager.

FIG. 16 shows a functional diagram of the archive manager 40. Within the video server, the archive manager selectively communicates with the schedule manager 38, the camera manager 12 and the video server database. Requests from the schedule manager 38 to the archive manager 40 will be for archiving or deletions, whilst requests from the camera manager 12 will be for restoring.

In response to archiving request, the archive manager 40 queries the video server database for the duration of the video data in which the archiving request is interested. If necessary, the video segment will be stripped from the physical video file on disk and copied to a separate file for archiving.

This may occur if, for example, a physical video file contains two or more overlapping video events that have different archiving requirements. A file may contain a period of scheduled recording that is due to be archived, whilst an event that needs to remain accessible on-line occurs in the middle of the recording. In this case, the physical video file is split into two, with the video on either side of the event being stripped from the on-line file and copied to a separate file for archiving. The video server database is then updated with the new file locations for each video clip affected. The archive manager 40 then instructs Windows NT 5 Removable Storage Manager to mount an appropriate media. The Window NT 5 removable storage manager is well know to those skilled in the art, and so is not discussed in detail.

Figure 3:
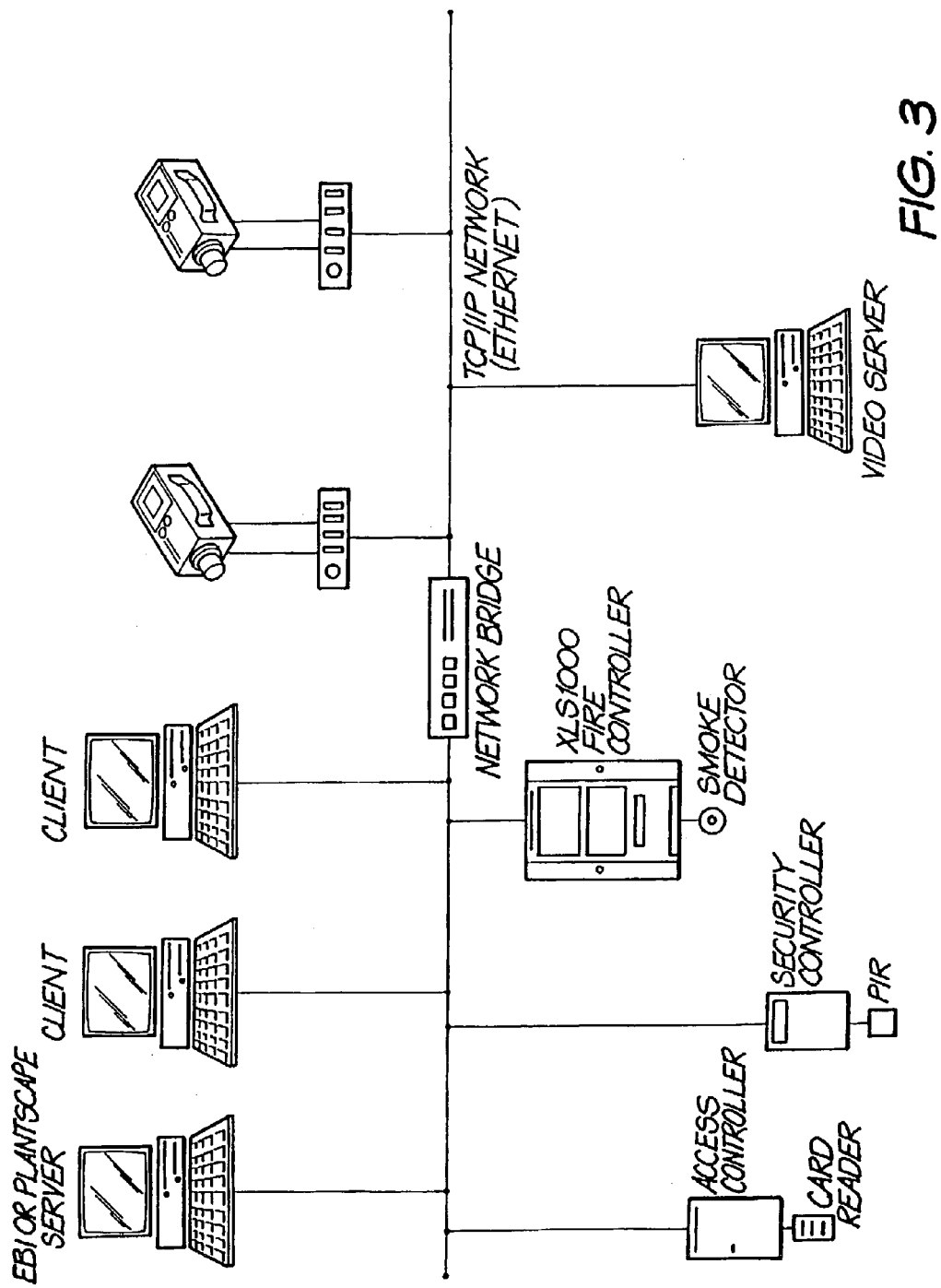
FIG. 3 shows an alternative embodiment of the system shown in FIG. 2, the alternative system also being in accordance with the invention.

An alternative embodiment of the system shown in FIG. 2 is shown in FIG. 3. In the FIG. 3 embodiment, features in common with those of the FIG. 2 embodiment are indicated with like numerals. The FIG. 3 embodiment differs from the FIG. 2 embodiment in a number of ways. The first of these is that the video server 8 is hosted on a separate computer from the other process control or security server 9. The system is implemented like this for a number of reasons, but is particularly concerned with enabling the video server 8 to service a greater number of cameras. Another major difference is the provision of a network bridge 42 linking a first segment 44 and a second segment 46 of the TCP/IP network 6. The cameras 2 and the video server 8 communicate directly with the second segment 46, whilst the client computers 2, the process or security server 9, and various transducers 48 communicate with the first segment 44. It will be appreciated by those skilled in the art of network design that this arrangement limits the network traffic generated by the various video signals from the cameras 2 to the second segment 46. The only video signal data that will reach the first segment 44 is that which is supplied from or directed by the video server to one or more client computers 10, in response to requests from those client computers 10 or alert conditions.

Figure 4:
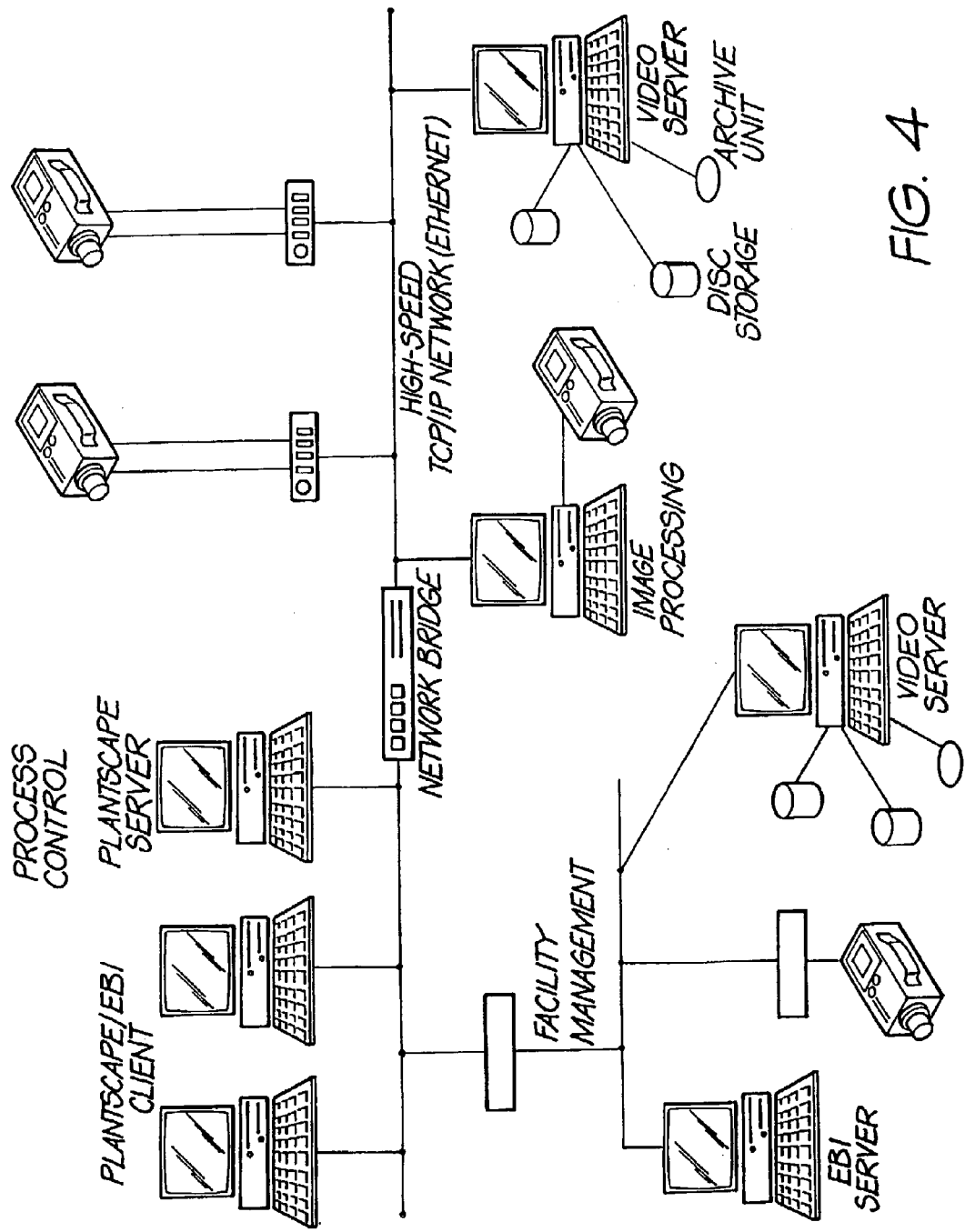
FIG. 4 shows another alternative embodiment of the system shown in FIGS. 2 and 3, the embodiment of FIG. 4 also being in accordance with the invention.

Another, still more complicated embodiment is shown in FIG. 4, in which there is shown an implementation having integrated facility management (security, etc) and process control. In this case, the video aspects of the system are integrated with process control, security and image processing. Again, network bridges 42 are used to link first, second and third segments (designated 44, 46 and 47, respectively) of the TCP/IP network 6. The various client machines 10 are able to access the facility management server 52, the process control server 54 and the various video servers 8, depending upon the access rights granted to their respective operators.

The use of multiple video servers 8 allows for a correspondingly larger number of cameras. Larger networks and installations requiring more cameras can be implemented simply by scaling the number of video servers and network segments. Naturally, there will be some restrictions on the ultimate size of the network and the number of servers and cameras. These restrictions will be appreciated by those skilled in the art.

In the FIG. 4 embodiment, image processing is implemented on a separate image processing computer 56 connected to the TCP/IP network 6. The types of processing undertaken are selected on the basis of the requirements of the system as a whole. For example, video related to perimeter management can be processed for image recognition purposes. Preferably, the image recognition data is recorded with the video details on the video database.

The image recognition data can also be supplied to the security or process control servers and used as inputs to their software routines or at least recorded as part of security logs. If, for example, a camera is used to inspect visitors approaching a reception area, the image processing computer 56 can be used to attempt to recognise each visitor. The resultant data can be used in many ways. It can be forwarded to the security server to ascertain whether the person has security access, or if there is a pending security issue related to that person. A comparison can be made with other security access data, such as entry codes and the use of security cards and transducers, to ensure consistency between the person's appearance and their identity as evidenced by other security devices and procedures.

Image recognition can also be used to process video from specific process control environments. The processed video can be, for example, colour or contrast filtered, sharpened or blurred, in any combination, and the output used as an input to the security server. In this way, process conditions and alarm notifications can be raised based on the processed video. The conditions and notifications can also be based on combinations of existing feedback data used in security management and process control.

In the preferred form, the output of the image processing computer 56 is in the same format as that of other camera streamers 4.

The following paragraphs provide a further description of a number of the more significant features of the preferred embodiment of the present invention.

Live video can be viewed at full motion and with insignificant compression delay from any EBI client.

Camera PTZ control is available from any EBI client using either a standard Windows pointing device such as a mouse or touch screen, or with a commercial joystick for greater user feedback.

Video recording can be activated by one or more of:
(a) Events and alarms generated by EBI can activate video recording on the present invention. Video associated with the alarms and events can include video recorded prior to the alarm or event.
(b) The user viewing an incident. When the user sees an incident they can record the incident including an amount of pre-recorded video so that the actual incident is not lost. Users can also add notes to the captured video.
(c) Schedules that can be one-off and recurring. This ensures an efficient use of the recording resources.

Tight integration with EBI allows alarms and events from those systems to activate video recording on the present invention. Video associated with the alarms and events can include video recorded prior to the alarm or event so that a user can see to what caused the incident as well as the aftermath. The alarm and event management capabilities of EBI bring a previously unavailable power of alarm and event condition determination to CCTV video recording.

Time indexed video storage ensures smooth playback and accurate retrieval.

Archiving to both single tape units and sophisticated robotic multiple tape units ensure that only important video is marked for long term storage, and that it is subsequently never lost.

User security assists users to perform their jobs efficiently and within their areas of expertise and authorisation.

Quad views allow a user to look at up to four cameras at once. The individual cameras within the quad view can be cycled to other cameras so that there are no limits on the number of cameras that can be viewed.

Multiple Monitor Support allows a user to view and control multiple video monitors from a single keyboard/mouse/joystick. With this feature you can create an advanced security control room, to run your surveillance operations.

EBI custom schematics allow live video to be inserted in custom schematics on EBI systems using the Honeywell Display Builder.

The network-based architecture of the present invention brings multiple benefits. It allows the system to leverage existing network investments, making the present invention both cost-effective and flexible. Processing power is moved to the camera and the client thus allowing the Video Server to support more cameras at a previously unavailable video quality.

Figure 22:
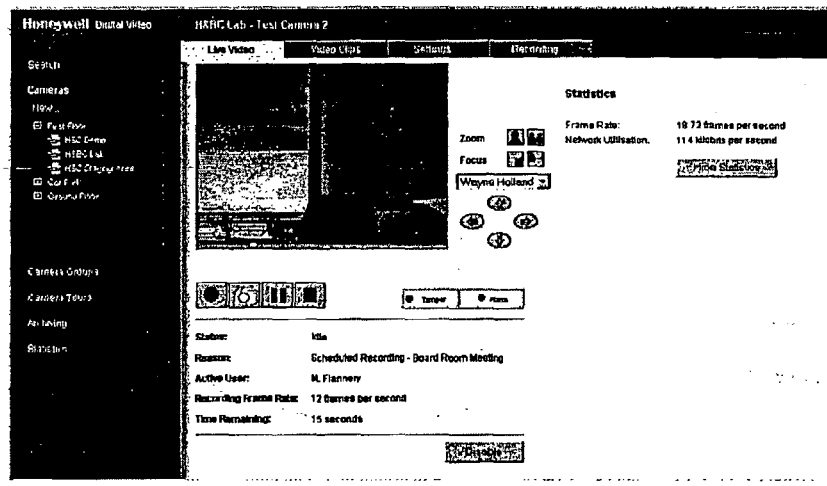
FIG. 22 shows a typical view of a client display screen, showing live video from a single camera.

FIG. 22 shows a typical view of a client display screen, showing live video from a single camera. From this screen, the operator can select a camera to be viewed, initiate real-time recording manually and perform all pan/tilt/zoom functions.

Figure 23:
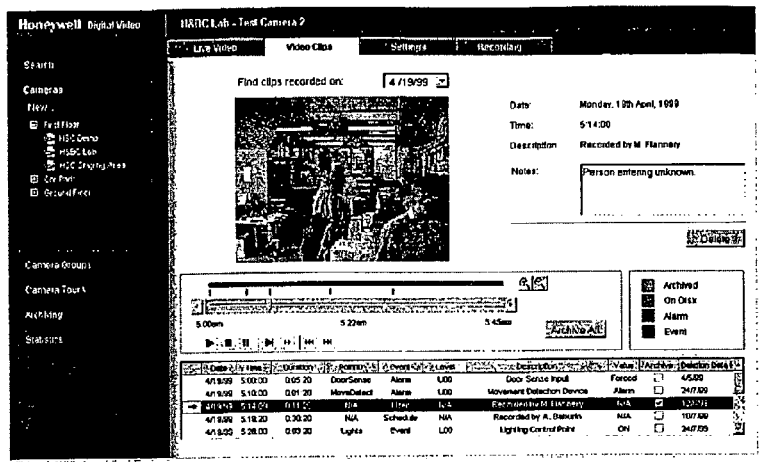
FIG. 23 shows a client display screen showing a Video Clip Review screen.

FIG. 23 shows a client display screen showing a Video Clip Review screen. The operator can search for a video clip using many different parameters. Once a clip is selected, the operator can review the footage at any desired speed.

Figure 24:
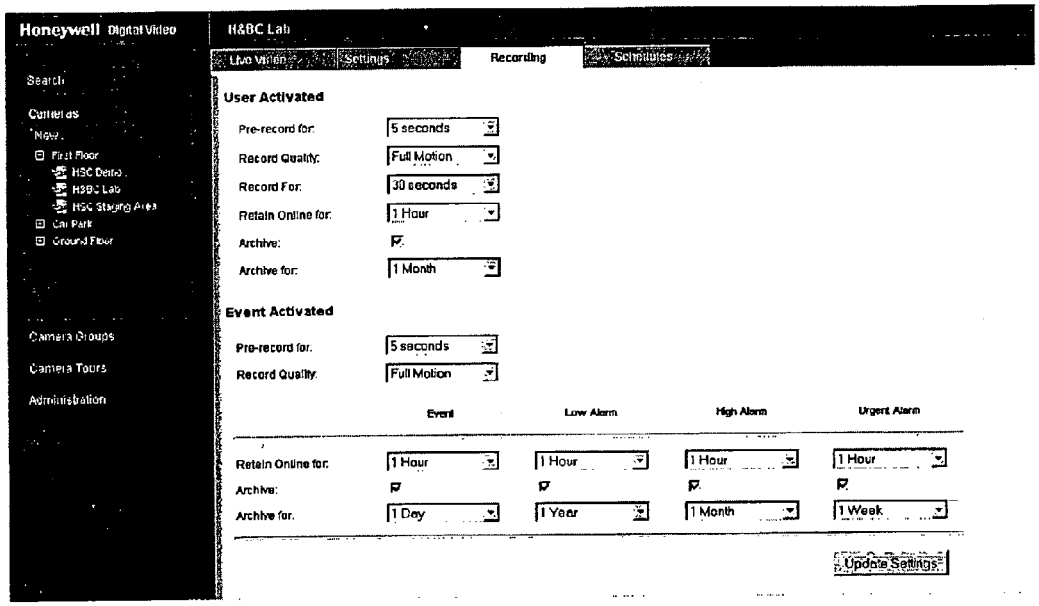
FIG. 24 shows a client display screen showing a Recording Screen.

FIG. 24 shows a client display screen showing a Recording Screen. Recording can be initiated by an occurrence of any alarm or event in the EBI system; on a time schedule (either one-off or recurring) or manually by the operator.

The following paragraphs provide a further detailed description of the system design of the preferred embodiment of the present invention. Throughout the following description the preferred embodiment of the present invention is referred to as the "Avalon" system.

In this description, the following acronyms have the following meanings:

| ACRONYM | MEANING |
| --- | --- |
| ASP | Microsoft Active Server Page |
| HMI | Human Machine Interface |
| HSC | Honeywell Software Centre |
| IE | Microsoft Internet Explorer |
| IIS | Microsoft Internet Information Server |
| NT | Windows NT Operating System |
| ODBC | ODBC. Open Database Connectivity. An open standard for database communications |
| RDS | Remote Data Service |
| MTS | Microsoft Transaction Server |
| ADO | ActiveX Data Objects |
| fps | Frames per second |
| ABO | Avalon Business Objects |
| COM | Component Object Model |
| DCOM | Distributed Component Object Model |
| RSM | Removable Storage Manager |
| ONV | Opennet View |
| PTZ | Pan-Tilt-Zoom |
| SQL | Structured Query Language |
| SCAN 3000 | Supervisory Control and Networking System developed by HSC |
| XSM | Excel Security Manager system developed by HSC |
| XFi | Excel Facility Integrator system developed by HSC. |
| IPS | Integrated Personal Station. Suite of GUI applications developed by HSC for use with SCAN 3000/XSM/XFi. |
| RTU | Remote Terminal Unit. Device abstraction used in SCAN 3000/XSM/XFi as a container for points. |
| API | Application Programming Interface |
| PAD File | Point Address Definition file. Used to store lists of point addresses for points which have been built using the point build utility. |

Figure 25:
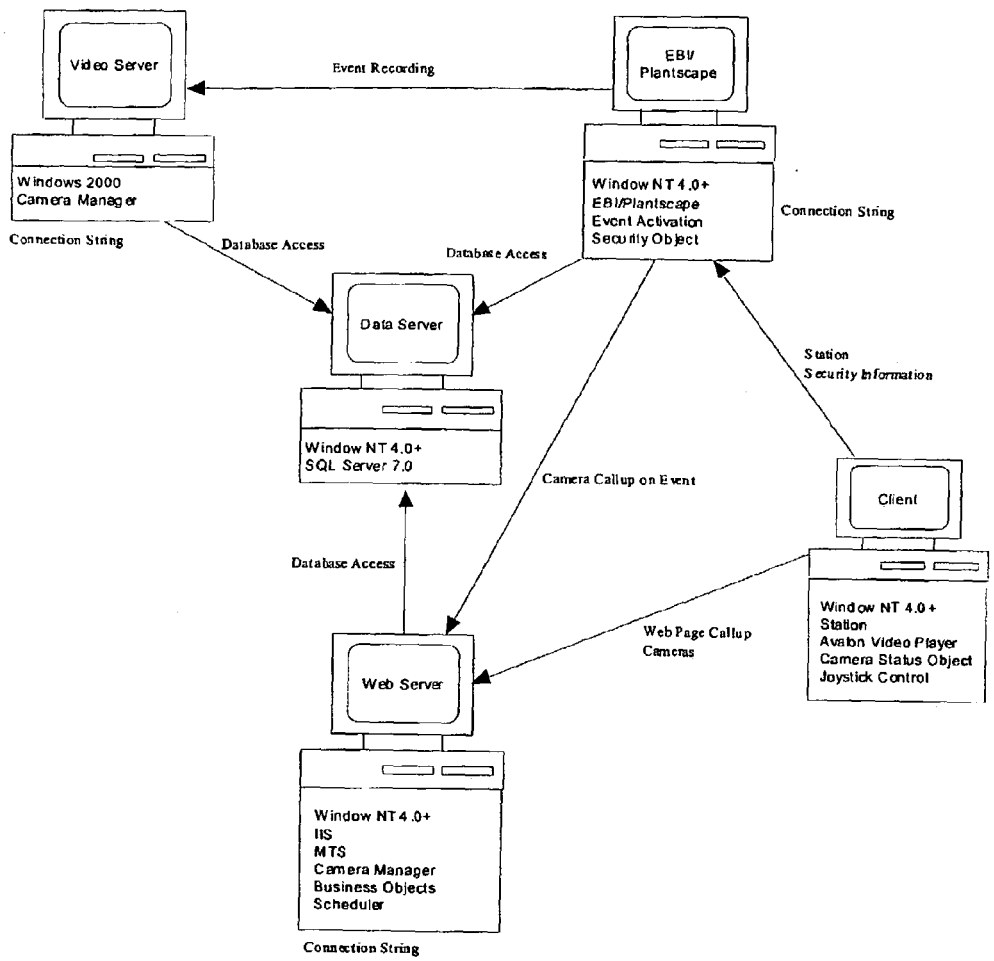
FIG. 25 is a block diagram illustrating key interactions between the components of the present invention.

FIG. 25 is a block diagram illustrating key interactions between the components of the present invention. In that figure it can be seen that the video server is responsible for streaming and recording video from the camera streamers. The data server is responsible for storing the configuration and operational data needed for operation of Avalon. All data is stored within a Microsoft SQL server 7.0 database. The web server is responsible for:
(a) Serving up the web pages to the Avalon web site;
(b) Video Schedules; and
(c) Hosting the Business Object in MTS.

The Web Server plays another role as the Primary Camera Manager. All connections to Cameras are via the Primary Camera Manager that resides on the Web Server. The effect of this is
(a) Access to Camera Manager from Business Objects and ASP can be via COM; and
(b) The EBI/Plantscape Host is responsible for telling the Camera Manager to record video based on events. The Client provides the user interface for the system. This is done via the Station software. A safebrowse object is placed within a particular display page within stations which navigates to the Avalon Web site. The majority of Avalon client software is downloaded from the Web Server when required.

FIG. 25b is a block diagram illustrating the viewing of live video using the present invention. From the HMI a user requests live video from the Primary Camera Manager on the Web Server. This request is passed to the Video Server that has the camera. The Camera Manager on this Video Server multicasts a stream of live video onto network. The video player picks up the network traffic corresponding to the user request and displays it on the screen.

Information regarding the video stream is propagated by the camera manager. This includes details such as the camera status (e.g. whether video is currently being recorded), the operator currently in control of the camera and for how long the operator will remain in control.

All Camera status events are passed via the Camera Status object.

Recording Video. There are three methods of recording video:

(a) A user can request currently viewed video to be recorded via the HMI by pressing the "Record" button on the video player;

(b) PlantScape/EBI alarms and events trigger the recording of video; or (c) A user can schedule a recording to take place at a certain date and time.

User Activated Recording. Referring to the block diagram illustrating User Activated Recording shown in FIG. 26, it can be seen that pressing the "Record" button on the active video player (within the HMI) will send a request to record video to the camera manager. The camera writes the video stream to the Data Storage Device. Information regarding the record request such as the Camera Name, User Name of the user who requested the recording and the Recording Time will also be written to the Data Server. After video is recorded, further information about the recorded video such as the duration of recorded video is also written to the Data Server.

Event Activated Recording. Referring to the block diagram illustrating Event Activated Recording of FIG. 27 it can be seen that when a PlantScape or EBI point that requires video capture goes into alarm, the host server will invoke an event handler process. In one embodiment this is an application process activated via the normal LRN method.

The event handler process will send a record request to the Camera Manager. The camera will write the video stream to the Data Storage Device. Information such as "Point ID" and "Host Name" will also be sent to the Camera Manager. This information is recorded along with other details of the recorded video to the Data Server.

Scheduled Recording. Referring to the block diagram illustrating Scheduled Recording of FIG. 28, it can be seen that a user can schedule a record request via the HMI. These record requests are entered into the database. It is the Schedule Manager that is responsible for notifying the Camera Manager that a recording is to take place.

The Schedule Manager is a process running on the Web Server. It polls the database every minute and caches a list of record requests for that minute. Since scheduled recordings are accurate to the minute, this list will contain the names of cameras that require video capture. The record requests for these cameras are sent to the Camera Manager and the Camera Manager writes the appropriate video streams to the Data Storage Device. Relevant details about the recorded video are also written to the database by the Camera Manager.

Viewing Recorded Video. Referring to the block diagram illustrating the Viewing of Recorded Video in FIG. 29, it can be seen that the viewing of recorded video is essentially the same process as viewing live video except that the Camera Manager obtains the video stream from Disk Storage Device instead of the camera source. The Video Player requests video by sending details such as "Camera Name", "Clip Date/Time" to the Camera Manager. The Camera Manager then reads the clip from the Disk Storage Device and streams the video stream to the requesting client via a point-to-point TCP/IP connection.

Video Recordings can be access from the Recordings tab for a Camera or via the Searching. Both these pages contain a Grid Control that displays all the relevant recordings. The Grid control is populated by Business Objects and RDS.

Changing Camera Settings. Referring to the block diagram illustrating the Changing of Camera Settings of FIG. 30 it can be seen that modifications to data in the camera settings page or the recording presets page will commit the new changes immediately. Prior to updating the information, the business objects will check the viability of the new changes. If there is a conflict in the new changes, the business objects will report an error to the client and no changes are committed. If the new settings do not produce any conflicts, the business objects will write the new changes to the video server database. The Camera Manager is notified of the change.

Security Integration. Each component in the system requires correct launch and access permissions to other components in the system for it to work correctly and to deny permission to clients which do not have authority to use the system. To do this, the system components are tightly integrated with NT, MTS and SQL security.

All HMI clients which require access to the Avalon system must be in the "DVS Users" NT group. The business objects only provide launch and access permissions to these users. In practice, the "DVS Users" group will contain users in the domain.

The business objects will in turn run as "DVS Manager" which is an NT user who has access to the database. The SQL Server database will use integrated security and only allow access to the database to users in the group "DVS Database." "DVS Manager" is one of these users.

Camera Manager and Schedule manager both require access to the database and therefore run as "DVS Manager." The EBI components run as "mngr" and also require access to the Avalon database. Hence "mngr" is in the "DVS Database" NT Group.

When business objects are instantiated from client script on a web page using the RDS.Dataspace object, their credentials are passed to the web server and then to the business objects. Hence, from the business objects point of view, the identity of the person who accessed it is the user logged on to the client machine.

This is the same for server scripts only if NT Challenge/Response authentication is used. If we allow anonymous access, the web server will act as IUSR_machinename. If IUSR_machinename is not in the "DVS Users" NT group the operation will fail.

To provide security at the business objects level, the "DVS Users" MTS role is created. This role will only contain the "DVS Users" NT Group.

In a similar way, SQL will have a "DVS Users" role which will only contain the "DVS Database" NT Group.

The following paragraphs describe the functions performed by each design component (block) identified in the preceding paragraphs.

Client. The client consists of the following components:
(a) HMI;
(b) Video Player Control; and
(c) Camera Control.

Human Machine Interface (HMI). The Human Machine Interface (HMI) is preferably implemented as a series of web pages. Its main function is to provide a graphical user interface to the core aspects of the Avalon project. It is through the HMI that users can:
(a) Configure the Video Server Database;
(b) Request live video from a particular camera;
(c) Search and view recorded video clips;
(d) View camera groups and camera tours;
(e) Configure cameras, camera groups and camera tours; and
(f) Perform administration tasks.

The web pages that form the HMI also serve as a container for ActiveX controls such as the tree view control and active video player.

The underlying components in a web based application is the web server (Internet Information Server) and the client browser (Internet Explorer). This structure is shown in the HMI System Block diagram of FIG. 26. As seen in that figure, the layout of the HMI may be broken down into four sections: a navigation section, a header details section, a tab section and a main frame. This is depicted in the block diagram of FIG. 27. As illustrated, the navigation section provides the user with the ability to navigate to different functional areas of Avalon. It consists of a main menu broken down into submenus depending on the functionality.

The navigation frame also houses the active tree view control used to navigate through the existing cameras. The tree view control displays a list of available cameras that the user may select to view. This tree control also indicates whether a to camera is in one of three states:
 (a) Recording;
 (b) OK (Camera is available);
 (c) Not OK (Camera is disabled, cannot connect—error status is shown in the HMI).

The preferred menu and submenu options available in the navigation frame are detailed in the table of FIG. 28.

Header Details. The header details section provides details about the page the user is currently viewing. These details could also include details about a camera, a camera group or camera tour if these were selected.

Main Frame. The main frame comprises of web pages that provide the interface to the functionality of Avalon. These pages change depending on the selection made by the user in the navigation frame.

The main frame preferably includes web pages that provide functionality to:
 (a) View live video;
 (b) View Camera Group;
 (c) View Camera Tour;
 (d) View video clips;
 (e) Add/Modify camera settings;
 (f) Add/Modify record settings;
 (g) Add/Modify recording schedules;
 (h) Add/Modify camera group settings;
 (i) Perform an advanced search; and
 (j) Perform a basic search.

Live Video. The live video page contains a single video player with functionality to allow a user to:
 (a) View a camera;
 (b) Record live video;
 (c) Take a snapshot;
 (d) Search for recent recordings available for the selected camera;
 (e) Control a camera; and
 (f) Disable a camera.

To disable a camera, the HMI contacts business objects which in turn ask the camera manager to disable a camera. When a camera is disabled, there is no streaming of live video and any associated recordings at that time will cease. When the user re-enables a camera, it is up to the HMI to initiate a request to the database manager to reconnect to the camera.

Camera Settings. When a user modifies the camera settings for a camera and clicks on "update," the effects of the changes occur substantially immediately. If the change in camera settings require resetting the camera streamer, such as the case of changing the video quality, it is the responsibility of the business objects to inform the camera manager of the changes and the camera manager will reconnect as required. Any current recordings is lost. Scheduled recordings will continue once the camera manager has reconnected the streamer.

Camera Groups. There is a display configured with four Active Video players. Each of these Video Players is configured to display live video for a particular camera. Each video player can also be configured to cycle camera connections.

The HMI provides the Active Video Player with the cycling timing and camera information.

Schedule Recordings. The schedule recording display provides functionality for a user to schedule a recording for a particular camera.

Schedule recordings may be marked as recurring. In one embodiment, if a user selects 9 am to 10 am on Monday and selects the daily option for 5 days, then a schedule is placed from Monday to Friday for 9 am to 10 am. If the user selects weekly for 5 weeks, then a schedule is placed on Mondays 9 am to 10 am for the next 5 weeks.

If a user decides to delete a schedule that was created as recurring, then he has the option to delete all related schedules or just the individual one.

Internationalisation. All text that appears on the Avalon web pages is preferably retrieved from the video server database. This includes all field labels, text within combo boxes and any other "floating" text that may be required on the web pages. Each piece of text will have a specific ID on the web page which is used to locate the place in which a text string is to be inserted.

For example, an ASP page may contain a field with an ID called lblCameraName. Server side scripts will call the business objects to obtain the corresponding text for this field which could be "CameraA". This piece of text may be in any language that is supported by the SQL database. It is up to server side scripts to fill the HTML elements with the obtained piece of text. In effect, all ASP pages is a skeleton of HTML elements. Server side scripts will construct the web page through calls to the database manager.

Video Player Control. The Video Player is an ActiveX control responsible for
 (a) Viewing Live Video;
 (b) Viewing Video Clips;
 (c) Providing an interface to the HMI to control the functionality of the player;
 (d) Generating Windows events for the HMI;
 (e) Displaying Video Information; and
 (f) Cycling Cameras.

Figure 29:
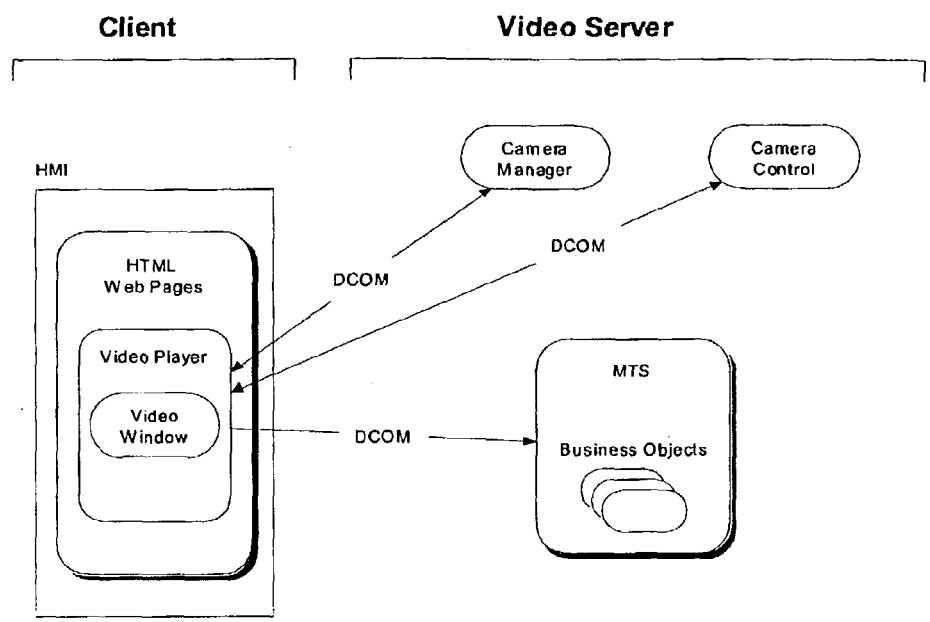
FIG. 29 is a block diagram illustrating Video Player Control.

The architecture of the Video Player is detailed in the block diagram of FIG. 29. There it can be seen that the Video Player control is a composite control that is composed of the following controls
 (a) Video Window Control; and
 (b) Common Slider Control.

Figure 44:
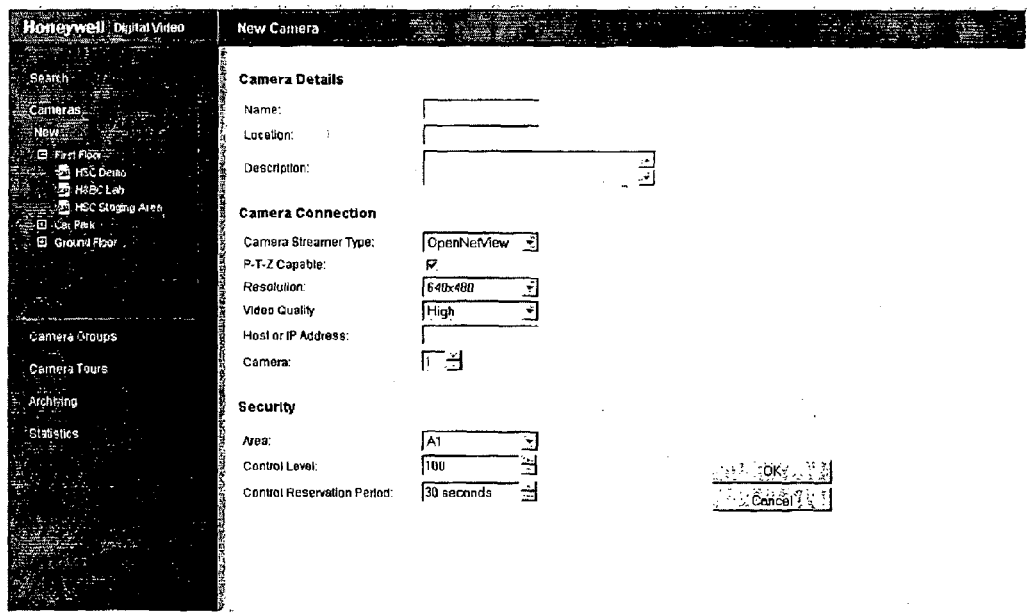
FIG. 44 is a screen dump of a sample client display screen showing the Add a New Camera screen of the preferred embodiment.

FIG. 44 is a table illustrating Video Player Interface Functionality.

Control and Information Panes. The Active Video player is a combination of a Video Viewing Window and two control and information panes. The control and information panes are
 (a) Live Video Pane; and
 (b) Playback Pane.

Video Player—Live. The Active Video Player is able to display live video by enabling the Live Video Pane. The following is displayed:
 (a) Video viewing window; and
 (b) Live Video Pane.

The Live Video Pane contains:
 (a) Control Buttons as detailed in FIG. 42;
 (b) Record indicator;

(c) Record duration timer;
(d) Current Date and Time;
(e) PTZ controls; and
(f) Zoom and Focus controls.

Figure 30:
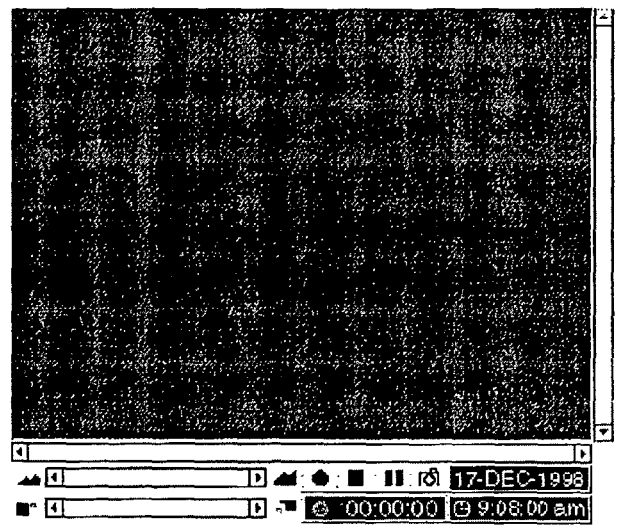
FIG. 30 is a screen dump of a client display screen showing a Video Player in Live mode.

FIG. 30 is a screen dump of a preferred embodiment of the client display screen showing a Video Player in Live mode. Preferably, there are no panes visible when the player is placed on the camera group display.

Video Player—Playback. The Active Video Player is able to display video clips by enabling the Live Video Pane. The following is displayed:
(a) Video viewing window
(b) Playback Pane The Playback pane contains:
(a) Control Buttons as detailed in the table of FIG. 42;
(b) Slider control for positioning within the current clip; and
(c) Current playback position timer.

When the Play button is pressed, Online Video is streamed for the current date/time location for the configured time frame. Video playback will continue until:
(a) STOP is pressed; or
(b) End of the currently selected clip.

Figure 31:
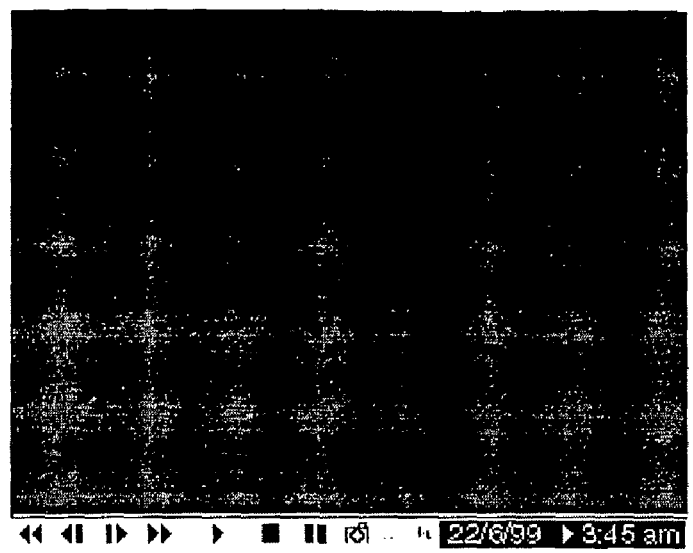
FIG. 31 is a screen dump of a client display screen showing Video Player in Playback mode.

FIG. 31 is a screen dump of a preferred embodiment of the client display to screen showing the Video Player in Playback mode.

Video Player Events. The Video player is required to notify it's container when specified events occur. This is done by generating Windows Events.

Camera Cycling. The Video Player is able to display a configured number of live cameras one after the other. The length of time each camera is displayed is called the cycle time. There is one cycle time per camera cycle list.

If a camera to be displayed is disabled, the camera is displayed for 1 second. A frame is displayed indicating that the camera is currently disabled. The next camera in the cycle list will then be displayed.

Video Window Control. The Video Window Control performs the following:
(a) Initiates the video streaming via communication with the Camera Manager; and
(b) Renders the video images into a window.

Rendering Engine. A rendering engine displays the video file in the Video Player Control. The Camera Streamers often supply the video stream in proprietary file formats (known as a CODEC). A different rendering engine is preferably used for each supported CODEC.

Event Viewer Control. This control displays the following information:
(a) The playback position in the current time frame of searched stored video;
(b) Location bar—The location of stored video, local or archive, indicated via coloured bars; and
(c) Event bar—Symbols indicating the time of alarm/events and snapshots.

This control provides the following control ability:
(a) Move to the start of the Next Alarm in the current time frame;
(b) Move to the start of the Previous Alarm in the current time frame; and
(c) Selection of an alarm/event or snapshot symbol. The Video Player will position to the time of the event, not the start of the clip.

Figure 32:
FIG. 32 is a screen dump of a client display screen showing the Event Viewer Control.

The Event Viewer control is only visible when the Active Video Player is configured to display stored video for a single camera. FIG. 32 is a screen dump of a client display screen showing the preferred Event Viewer Control.

Only clips whose recording events are contained within the searched time frame are able to be played. If a pre-record portion of the clip is prior to the start of the frame, or the recording continues past the end of the frame, these sections will not be able to be accessed.

Figure 12:
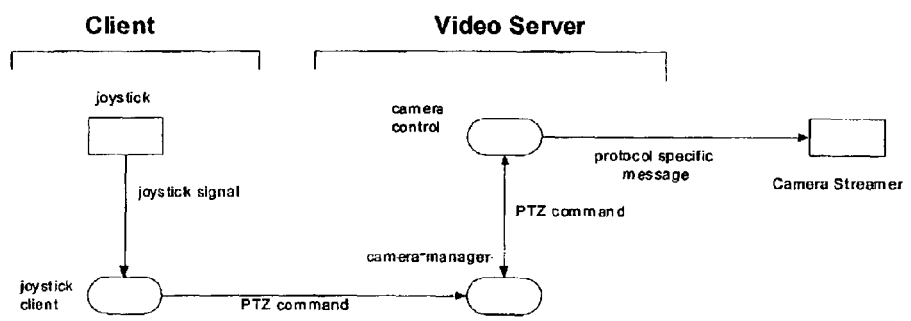
FIG. 12 is a block diagram showing implementation of a joystick client for assisting camera control.

Joystick Client. The joystick client forms part of the camera control subsystem. The joystick client software will physically reside on the HMI client PC. It is responsible for interfacing to the joystick and sending the joystick commands to the Camera Manager on the Avalon server. If appropriate, the camera manager will forward the request to the camera control subsystem. This is shown in the block diagram of FIG. 12.

PlantScape/EBI Server.

Event Activation. The event activation subsystem will upon an event:
(a) Cause the Avalon server to record a specified camera; and
(b) Optionally cause a station (or all stations in an area) to switch to view the camera page.

Figure 17:
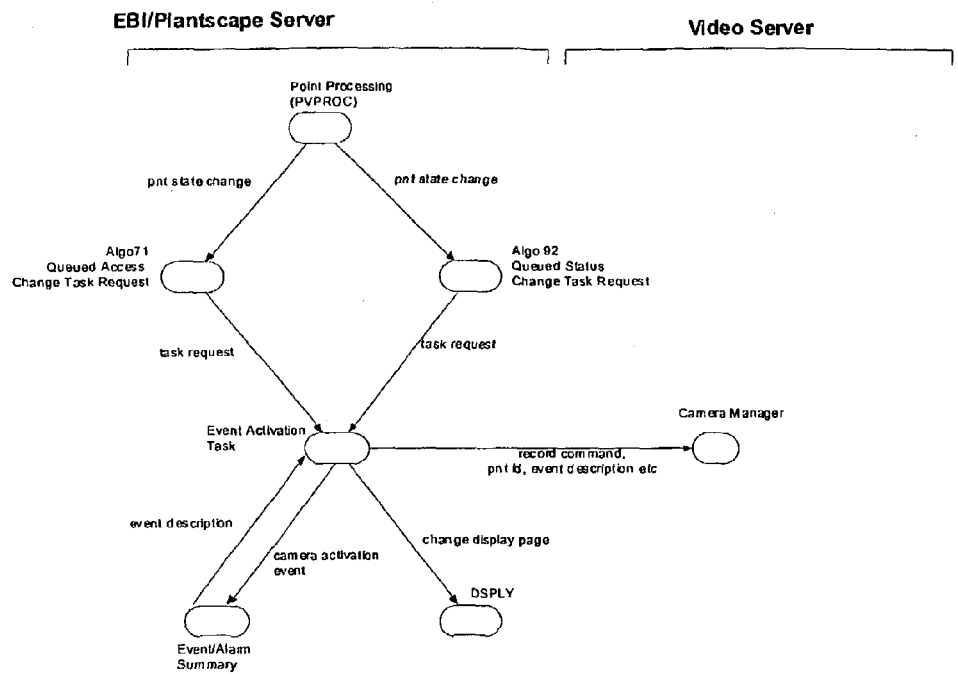
FIG. 17 is a block diagram illustrating Event Activation (EBI version)
Figure 18:
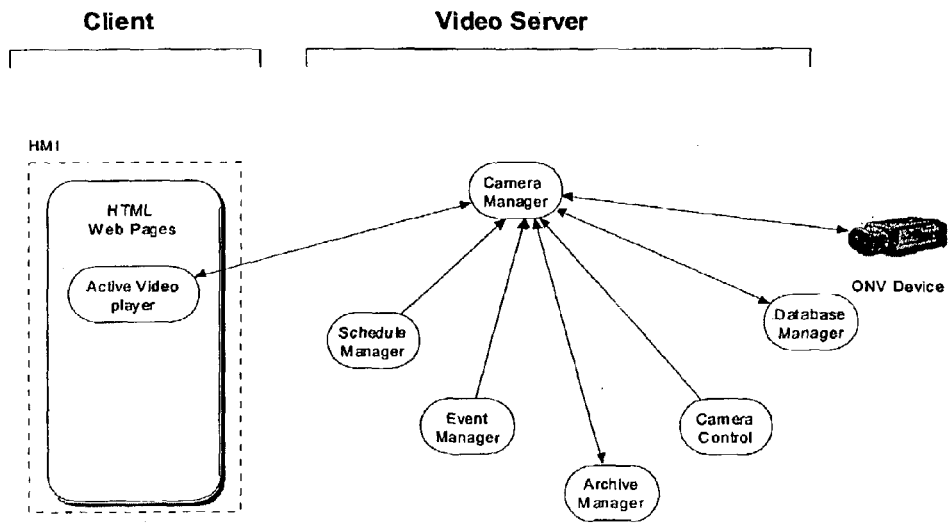
FIG. 18 shows the relationship between the camera manager and other controls and managers on the video server.

The Event Activation task is an EBI/PlantScape application task and hence will reside on the EBI/PlantScape server machine. The interaction of the Event Activation task with it's surrounding subsystem is shown in the block diagram of FIG. 17.

The activation mechanism in one embodiment of the present invention is via the use of algorithms. In EBI, Algo71 is used to request the Event Activation task when an access point changes states and Algo92 is used when a status point changes state. In Plantscape, Algo71 will request the Event Activation task when a status point changes state. There is no corresponding algo for access points in Plantscape.

When the point changes state, the appropriate algo will call the Event Activation task passing parameters that are configured when the point was point built. Because it is not possible to configure different task request parameters for different states of the points. The same camera record action will occur irrespective of the state of the point.

The Event Activation task will then instruct the camera manager to record the camera video, and optionally cause a station (or all stations in an area) to switch to the camera view. The event description for the event that initiated the event activation is also passed to the camera manager. This will allow the camera manager to raise an audit message in Avalon. The Event Activation task will also place an event in the event file in Plantscape/EBI.

Security System Functionality. The security system is responsible for providing security information that resides in the EBI or Plantscape server database. Information that it provides include:
(a) The name of the operator currently logged into station
(b) The areas which this operator has access to
(c) The security and control level of the operator From this information, the Avalon components can decide whether a user can have access to certain functionality provided by Avalon.

Cameras are assigned areas. When a user logs in, information about the access privileges of that user decides how the active tree control is constructed. Any camera not within the user's list of areas will not be displayed.

The control level of a user determines whether or not a user has PTZ capability enabled for certain cameras.

The security level of an operator governs the actions that a user can carry out. These include whether or not a user can:
(a) Modify or add new camera settings;
(b) Modify record settings; and/or
(c) Issue record and archive commands.

A more concise description of the permissions available for a given security level is shown in the table of FIG. 38.

Configuration Page. A display page is built to configure the URL of the Avalon Video Server. This value is stored in a Plantscape/EBI user file. This value is used in the configuration of pages that contain navigation buttons to navigate to the Avalon displays.

Video Server.

Video File Structure. Each video clip is stored as a sequence of 1 or more segments. A segment contains a sequence of images (frames), and inter-frame timing information. The format of each frame is dependent on the source of the video stream. For example, if a clip was recorded from an Axis streamer, each frame is in JPEG format. A segment also contains indexing information that allows the location of a particular frame to be rapidly located. For example, playback may be required from 10 seconds into the segment. Indexing provides the file offset for the first frame of the playback.

The index information and the video content of a segment are stored in 2 separate files. This is so that during recording of a segment, information can be written to the 2 files simultaneously. Playback of a segment may begin while the 2 files are still being written.

Figure 33:
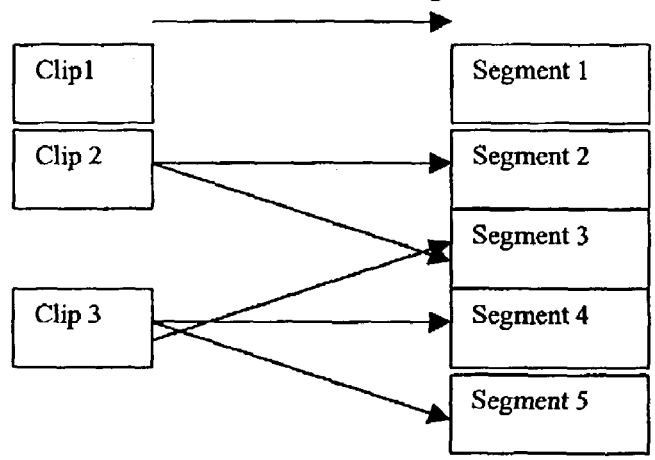
FIG. 33 is a block diagram illustrating the many-to-many relationship between clips and segments.

A segment can be referenced by one or more clips. This reduces the amount of physical storage required for a number of clips that overlap in time. FIG. 33 is a block diagram which shows an example of the many-to-many relationship between clips and segments. This relationship is described in a number of tables in the Avalon database.

Camera Manager. The Camera Manager is responsible for the following functionality of the Video Server:

(a) Camera Streamer Connections;
(b) Enable/Disable Cameras;
(c) Live Video Streaming;
(d) Stored Video Streaming;
(e) Live Video Recording; and
(f) Camera Control Reservation.

Camera Streamer Connections. The Camera Manager manages the connections to the Camera Streamers. This involves both connection and disconnection requests. The Camera manager is able to simultaneously stream multiple video streams.

The Camera Manager makes a connection to the Camera Streamer device at system startup or when the camera in enabled. If there are no configured pre-record times, the connection frame rate is at 1 fps. If there are pre-record times greater than 1 fps, then these is used.

Enable/Disable Cameras. A camera is able to be enabled/disabled via the HMI. When a camera is enabled, the camera manager will:

(a) Perform any active scheduled tasks; and
(b) Begin pre-record streaming if required.

Recordings initiated by a user or a Plantscape/EBI event will not be restarted when a camera is enabled.

When a camera is disabled, all operations being performed on the camera are cancelled immediately. This includes any form of recording and streaming.

Live Video Streaming. The Camera Manager Streams Live Video upon the first connection request by a client. Streaming is achieved via Multicasting. The Camera Manager receives frames from the Camera Streamer and then re-broadcasts the frames. This broadcasting will stop when no clients are viewing the Camera.

Stored Video Streaming. The Camera Manager receives requests from Clients to play stored video. If the video to be played is not online, then a request is made to the Archive Manager to load the video from archive.

Stored Video is not multicasted. Multiple clients are able to view and control the same piece of video simultaneously without affecting each other.

Video Recording. Live Video Recording can be initiated by the following:

(a) Scheduled Recording—Initiated by the Schedule Manager;
(b) Event Recording—Initiated by the Event Manager; or
(c) Manual Recording—Initiated by the User.

Video is recorded to files to be stored on the Video Server. The camera manager will add a record in the Video Clips table.

Camera Control Reservation. The Camera manager is responsible for coordinating control of the PTZ functionality.

Camera State Object. The Camera State is a COM Automation object implemented in a DLL. This object is used by the HMI and Video Player to retrieve state information about cameras. The HMI and Video Player should not retrieve this state information directly from the Camera Manager.

The Camera Manager sends multicast datagrams whenever an event occurs, such as the change in state of a camera. The Camera State object listens for these datagrams, and raises a COM event describing the camera event.

Multicast datagrams are not reliable. That is, there is no guarantee that datagrams will arrive at their destination, and there is no guarantee that datagrams will arrive at the destination in the same order that they were sent. Therefore, the Camera State object and Camera Manager implement a simple protocol to allow for lost and out-of-order datagrams. This protocol is described in the Camera Manager Software Design.

Figure 11:
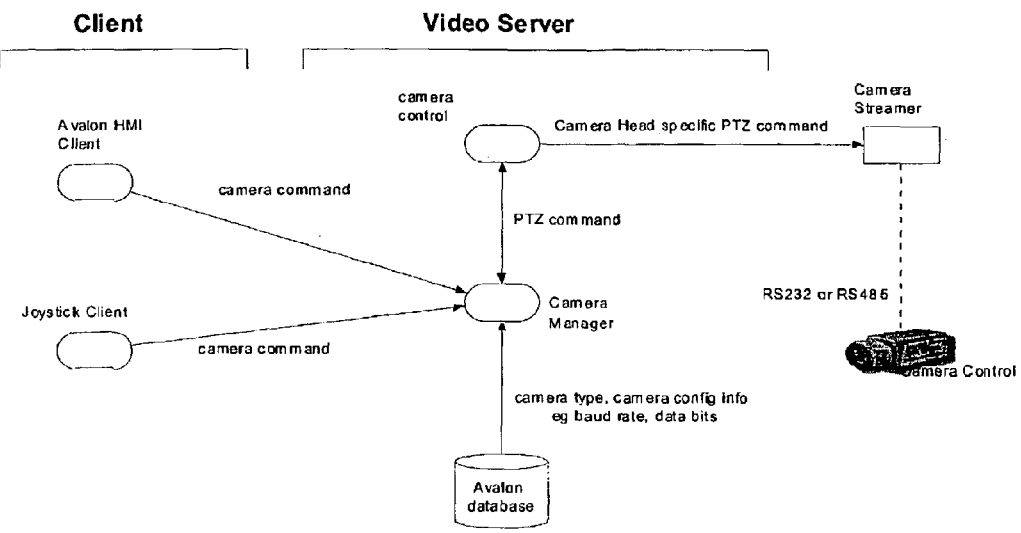
FIG. 11 is a block diagram showing implementation of camera control.

Camera Control. The camera control subsystem provides a means of controlling PTZ (Pan/Tilt/Zoom) capable cameras through the Avalon HMI or a joystick. Communications to the camera is via a camera streamer. The interaction of the camera control with the surrounding subsystems is shown in the block diagram of FIG. 11.

The Avalon HMI client and the Joystick client issue camera control commands to the Camera Manager. The Camera Manager is responsible for handling priority and reservation requests. The Camera Manager may choose to deny camera control functionality to a client, for example if the camera is currently being controlled by another user on another client machine. If permission is granted, the request is forwarded to the Camera Control subsystem. Camera control will then issue the necessary commands to the camera streamer to control the camera head.

Configuration information for the camera control subsystem is stored in the Avalon database and provided to the camera control by the Camera Manager when it is created and initialised.

The table of FIG. 39 details the superset of camera operations. However, the actual supported functionality is dependent on the camera type.

PTZ commands can be either step or continuous. Step PTZ commands will PTZ the camera a fixed increment while continuous PTZ commands start the camera PTZing, no stop command is sent. It is up to camera control to decide which type of PTZ movement it will execute.

The Continuous PTZ function is used by the joystick for PTZ movement. It either does continuous PTZ or returns an error if continuous PTZ is not supported.

Video Server Database. The video server database is preferably implemented on the MS SQL Server 7 relational database manager. All database access is via the Avalon business objects which use ADO to access the database.

All text data in the database is stored as a datatype that supports 32 bit Unicode characters. This will allow the HMI to store internationalized strings in the database.

Referring to FIG. 14 there is shown is a functional block diagram illustrating the Schedule Manager. The Schedule Manager runs as a Windows NT Service and is responsible for all scheduled operations in Avalon.

The schedule manager has two main functions:
(a) Scheduled video recording; and
(b) Scheduled deletion of video clips Scheduled Recording Requests. On start up of the Service, the Schedule Manager queries the database to determine the record schedules that are currently active (i.e. should be currently recording). A record request is sent to the Avalon Camera Manager for each of these schedules, and each of the associated cameras is instructed to begin recording immediately.

The Camera Manager is responsible for recalculating the record duration depending on the actual start up time relative to the scheduled start time of the recording.

The Schedule Manager will then periodically run at the boundary of every minute and start record schedules that are due to start since the last time it ran. The Schedule Manager will inform the Avalon Camera Manager to start recording for each recording request due. The Schedule Manager provides the camera manager with the Schedule ID.

Scheduled Deletion. At the boundary of every minute the Schedule Manager queries the database for any video clips whose DeleteDateTime has passed. A request is made to the Camera Manager to delete any such clip.

Other. If the recording and deletion operations take greater than 50 seconds (i.e. the poll period) to run, then the Schedule Manager will query the database for any missed schedules and run these immediately. This event however, is unlikely to occur.

Archive Manager. Archiving of video is preferably performed using the Windows2000 Remote Storage subsystem. This subsystem allows the operating system to move files from disk to tape on a least recently used basis. The file still appears as a normal file in the file system and is accessible using normal file access methods. The operating system will automatically restore the file to disk when it is accessed. Since this may take some time, the camera manager will check the status of a file before opening it and will warn the user if a file is currently on tape. If a file is on tape and that tape is not present in the system, the camera manager will generate a request for the user to load the correct tape.

Logging. There are two mechanisms in Avalon for logging of events and actions:
(a) Audit Log; and
(b) Engineering Log.

The Audit Log provides a means for other subsystems to log user or system events to a common storage. Typically these are run time operational events. The engineering log is used for engineering, diagnostic and debugging type information.

Audit log messages are structured in format, this allows them to be sent to the event file in EBI/PlantScape. While Engineering log messages are unstructured text strings.

The maximum size of the audit and engineering log is configurable in the database. When a log message is added that would cause the log to exceed it's maximum size, the oldest message is discarded.

Audit Log. The audit log subsystem provides a means for other subsystems to log user or system events to a common storage. Some of these events may be forwarded onto the PlantScape or EBI for inclusion in their event file.

Figure 19:
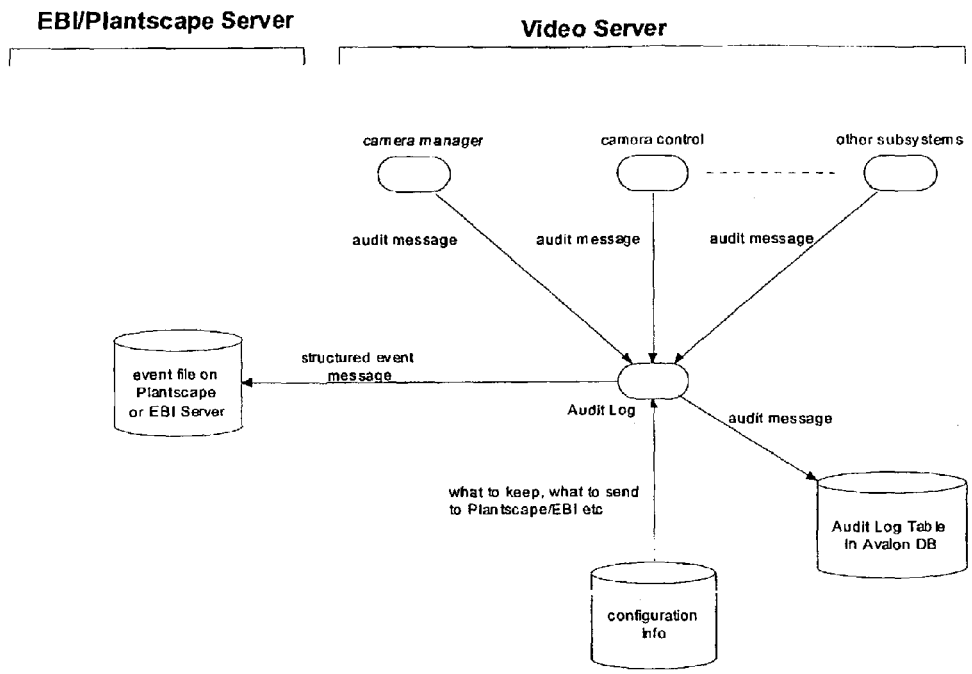
FIG. 19 is a block diagram showing implementation of an audit log.

Avalon subsystems such as the camera manager and camera control send audit messages to the Audit log subsystem. These audit messages are then inserted into a log table in the Avalon database. Configuration information in the Avalon database will determine whether this information is also forwarded to EBI/Plantscape for inclusion in its event file. The block diagram for the Audit Log subsystem is shown in FIG. 19.

In alternative embodiments, the audit log provides the framework for implementing audit trailing.

Figure 20:
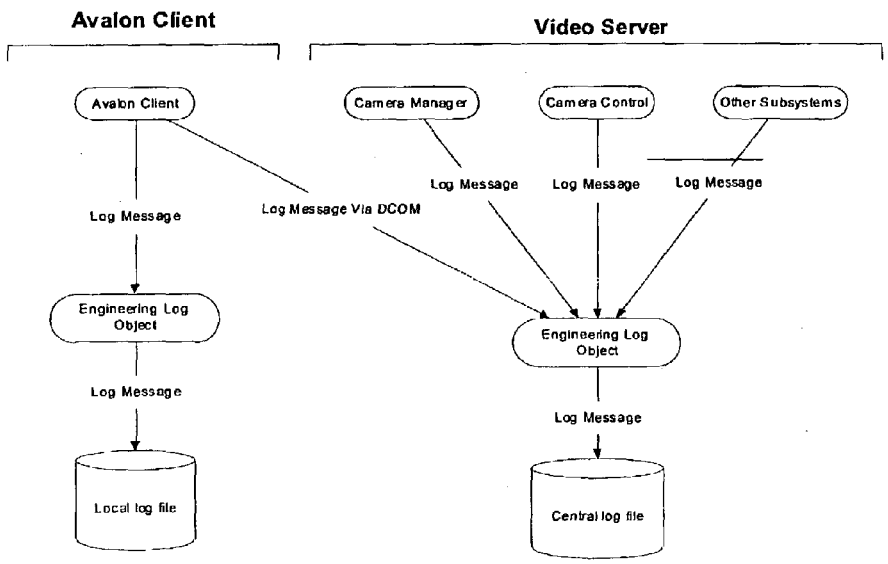
FIG. 20 is a block diagram showing implementation of an engineering log.
Figure 21:
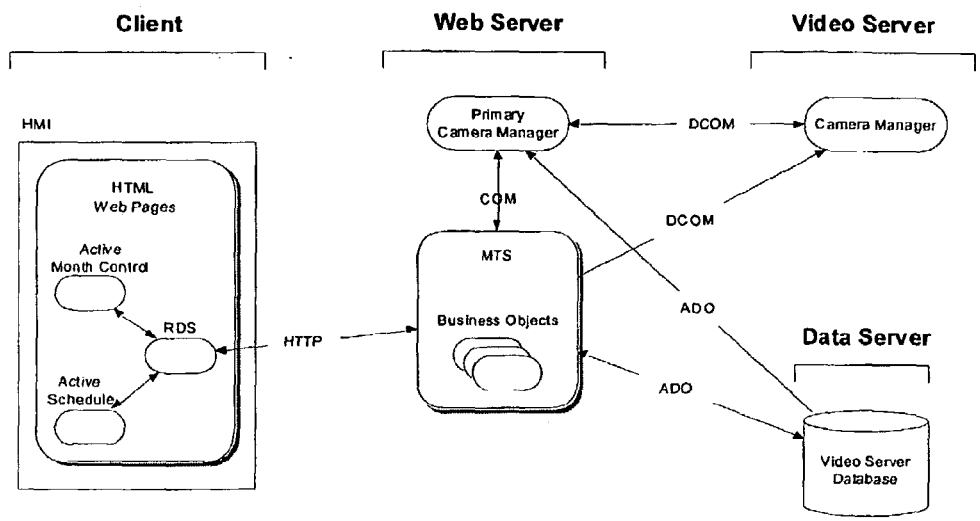
FIG. 21 is a block diagram illustrating the Changing of Camera Settings.

Engineering Log. The engineering log is functionally similar to the audit log but is used for engineering, diagnostic and debugging type information. Engineering messages is free format messages ie unstructured text strings. The log can be written locally or remotely via DCOM. This allows a client machine to log locally or to send its log messages to a central Avalon log file. The block diagram for the Engineering Log subsystem is shown in FIG. 20.

Avalon Business Objects. The Avalon Business Objects (ABO) are responsible for the management of data access by the user through the HMI and other Avalon components. It contains application specific logic related to the data services required by Avalon. These data services may be broken down into the following functional areas:
(a) HMI specific;
(b) Camera specific;
(c) Recorded video; and
(d) Camera group.

Wherever possible the business objects will use stored procedures to perform its tasks. However, there are cases where straight SQL queries are performed in the business objects. Since a major portion of the business objects functionality involves the use of disconnected recordsets, updating of these recordsets are performed by calling the UpdateBatch method on the ADOR recordsets. This method cannot be called on recordsets retrieved by stored procedures.

HMI Specific. This is mainly concerned with the retrieval of information required to display the Avalon web pages. This includes retrieving field labels and text, combo-box text fields and text used to construct the Active Treeview Control, header text and menu items from the database. All text which appear in a web page is obtained through the business objects.

Camera Specific. This includes data services required to retrieve and update the camera settings for a particular camera. It also includes the functionality to delete a camera from the database and any associated fields. This may involve a cascade delete. Likewise, the addition of a new camera into the database will form part of the camera specific data services.

Other functionality required include retrieving and updating any record settings associated with a camera and checking that the settings are viable. This includes all user activated record settings, event activated record settings and scheduled record settings. Notifications of the changes to the camera manager will also be part of the business object's services.

The business objects may also request that a camera be disabled or enabled.

Recorded Video. This includes any data access functionality required to access recorded video in a database. This also covers the searching of recorded video in the database based on the search fields a user entered in the HMI.

The submission of deletion dates into the database of which the schedule manager is to respond to when the time arrives will also be done by the business objects.

Camera Group. This includes the database access functionality associated with camera groups. This includes any data access required when creating new camera groups, editing camera groups or deleting camera groups.

Figure 34:
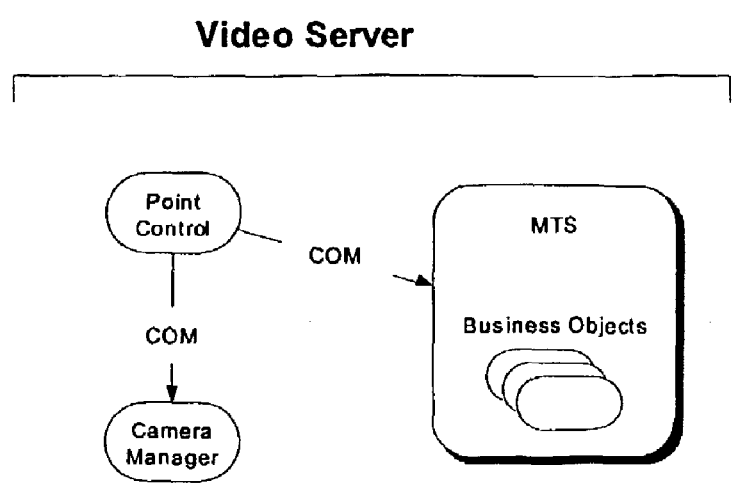
FIG. 34 is a block diagram illustrating Point Control.

Point Control. The point control component controls a Plantscape/EBI point to a controlled state using the Network API. This component resides on the Video Server. The server name is obtained from the Video Server Database. FIG. 34 is a block diagram illustrating Point Control.

For each block, identify which functions described in the specification is performed by the block, and the proposed or preferred methods of implementation.

Interface Description. The following paragraphs describe each of the interface types used to connect design components (blocks) discussed in the preceding paragraphs.

HMI.

HMI Interface to Business Objects from Server-side Scripts. The HMI obtains all HMI related data from the video server database via the business objects. When a user navigates to a certain web page, the server side scripts instantiate a business object and obtain relevant information to build the web page. This includes obtaining all field labels, text within combo boxes and any other text that may appear on the web page. Server side scripts construct the web page based on the information stored in the database.

Figure 35:
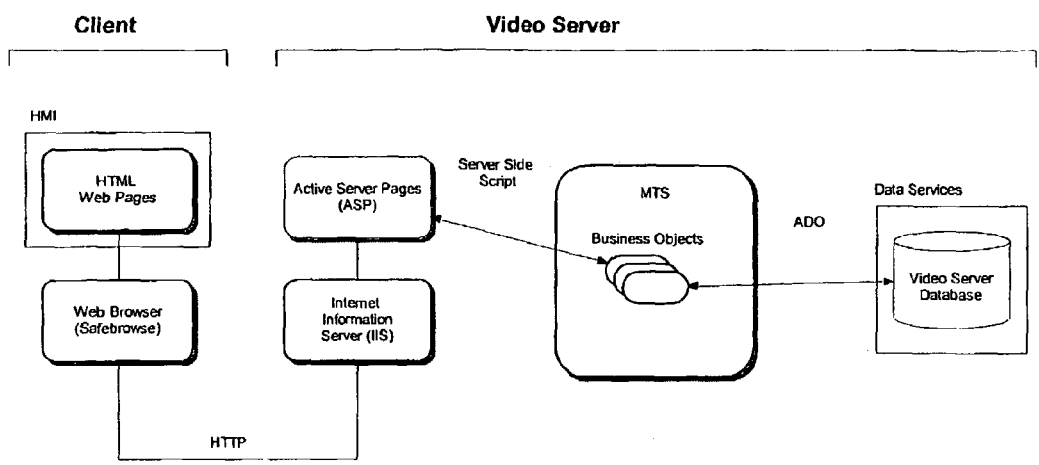
FIG. 35 is a block diagram illustrating the Component interaction between web pages and the business objects.

The component interaction in this case is depicted in FIG. 35.

Figure 36:
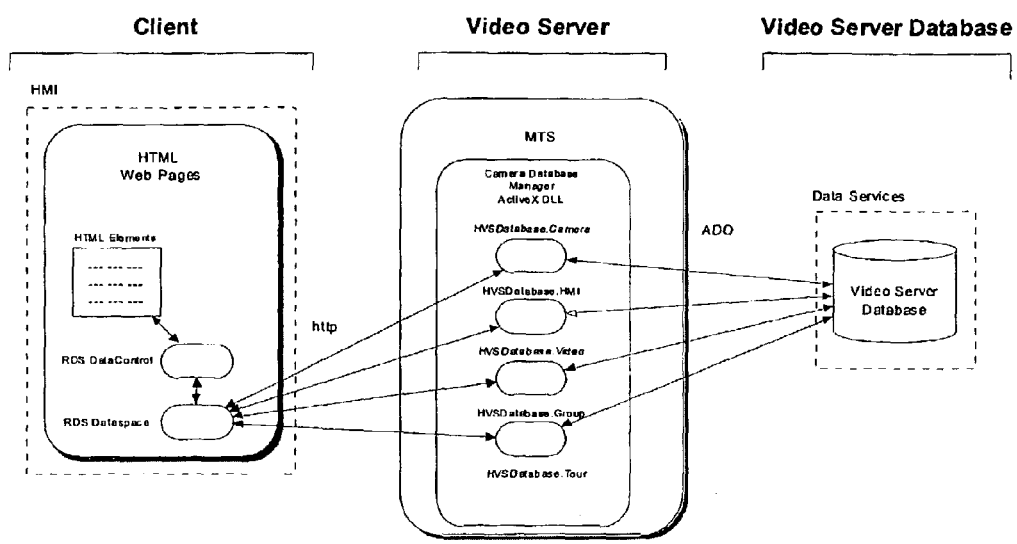
FIG. 36 is a block diagram illustrating Business objects instantiated by client side scripts.

HMI Interface to Business Objects from Client-side Scripts. FIG. 36 shows the component interaction for the case where client side scripts creates the Avalon business objects. In this case, HTML elements are bound to a datasource specified by the RDS.DataControl object. The instantiation of the business objects is done by the RDS.Dataspace object. This object uses HTTP to communicate (pass recordsets) to the business objects. Access to the Video Server Database will still be via ADO.

Figure 37:
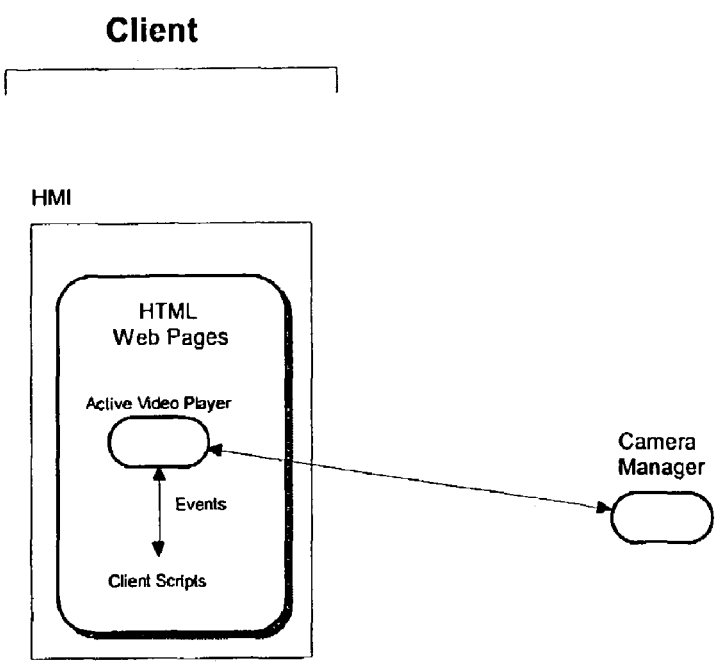
FIG. 37 is a block diagram illustrating Web page interaction with the Active Video Player.

HMI Interface to the Active Video Player. The HMI is a container for ActiveX controls and this is how it is able to display video from the camera streamer. It is the Active Video Player which request connection to the camera streamer via the camera manager and displays the video that was broadcast onto the LAN. The HMI is able to capture events from the Active Video Player and client side scripts will respond to them accordingly. This interaction is shown in FIG. 37.

The HMI does the following:
(a) Configures the Video Player to stream either live or video clips;
(b) Sets the camera to stream; and
(c) Sends a start request for live video viewing.

Video Player Control. The Active Video player provides the following interfaces:
(a) ILive—interface for displaying a live video stream;
(b) IClip—interface for displaying video clips; and
(c) IConfiguration—interface for modifying the Player.

Video View Window Control.

Camera Control. The camera control is preferably implemented as a C++ classes.

To create a camera control object, the Camera Manager will firstly create a CheadConfig and a CstreamerConfig object using configuration values from the Avalon database. These objects contain configuration information for a camera head and camera streamer respectively. Camera Manager then calls to CCameraBuilder::NewCamera( ) passing the CheadConfig and CstreamerConfig object. A CameraHead object is returned by NewCamera. This object is used by camera manager to control the camera.

Event Activation. As the event activation mechanism uses algo92 and algo71, the parameter block that is passed to the Event Activation task is used.

In order to switch the station view, the camera no. and station no./area are sent to the display system. The station no./area identifies the station(s) to switch and the camera no identifies the camera to view. The URL of the Avalon Server is obtained from the Avalon User File.

In order to record video, the camera no., pre-record time and post record time are sent to the camera manager. For audit logging purposes, the point number, point state and event description are also sent.

Camera Manager. The Camera Manager is preferably implemented by 3 COM objects. They are:
(a) The CameraManager object provides methods to perform camera management operations. Examples of these operations are creation and deletion of cameras;
(b) The Camera object provides methods to perform operations on a camera. Examples of these operations are recording of live video, and deletion of a video clip; and
(c) The PlaybackStream object provides methods to perform playback of a video clip. Operations include pause, resume, step, and setting playback position, speed and direction.

The rationale behind implementing the Camera Manager as 3 objects is to allow for a system architecture with multiple Video Servers. A single Video Server may be configured to manage a subset of all the cameras. In this architecture, to create a new Camera object instance, a referral object is used to locate the correct Video Server, and to create the new instance on that server. The GetCamera( ) method in the CameraManager object fulfils this role. The location of the Camera object instance is transparent to the clients of the CameraManager and Camera objects.

Schedule Manager. The Schedule Manager does not receive requests or messages from any other Avalon subsystem. Task timing is handled internal to the schedule manager using Windows NT system calls.

Logging.

Audit Log. The audit log process provides all other subsystems in Avalon with a way of writing an audit log message to a common storage. This log message may be forwarded to EBI/Plantscape for inclusion in their event file depending on Avalon configuration details. This is implemented as a function that can be called by other subsystems.

Engineering Log. The engineering log process provides all other subsystems in Avalon with a way of writing a log message to a common storage. The engineering log process is similar to the audit log process. This is implemented as a COM object.

The Engineering Log object HWDVSLog exposes one interface EngLog. This interface exposes three methods— LogMessag, LogCErr and LogNTErr.

Avalon Business Objects. The business objects preferably have interfaces that allow client browsers and other Avalon components to access its functionality. They preferably also have interfaces to the SQL video server database.

Client stations (web browsers) can access the business objects either by server side scripts on Active Server Pages (ASP) or by HTTP from client side scripts. Data access is achieved through ADO. Other Avalon components requiring database access will obtain a COM interface to the business objects. In this case, the transport method is DCOM.

The business objects are implemented as an ActiveX DLL. It is composed of COM objects that reside in the ActiveX DLL which is in turn registered in the Microsoft Transaction Server. The reason for including these objects in MTS is that MTS provides a robust environment for multi-user support. MTS provides an infrastructure that efficiently manages system resources such as threads, processes and connections. It also manages object instantiation, execution and deletion.

In FIG. 35, the interaction of the business objects with the video server database, other Avalon components and the HMI are shown. This diagram depicts the case whereby the business objects are instantiated by server side scripts in ASP web pages. The business objects access the Video Server Database via the ActiveX Data Objects (ADO). Other Avalon components may also call methods on the business objects by obtaining a COM interface to it.

FIG. 35 shows the component interaction for the case where the business objects are instantiated by client side scripts via the Remote Data Service objects. In this case, the communication between the business objects and the client side RDS object is via HTTP. Access to the Video Server Database is still be via ADO.

Figure 40:
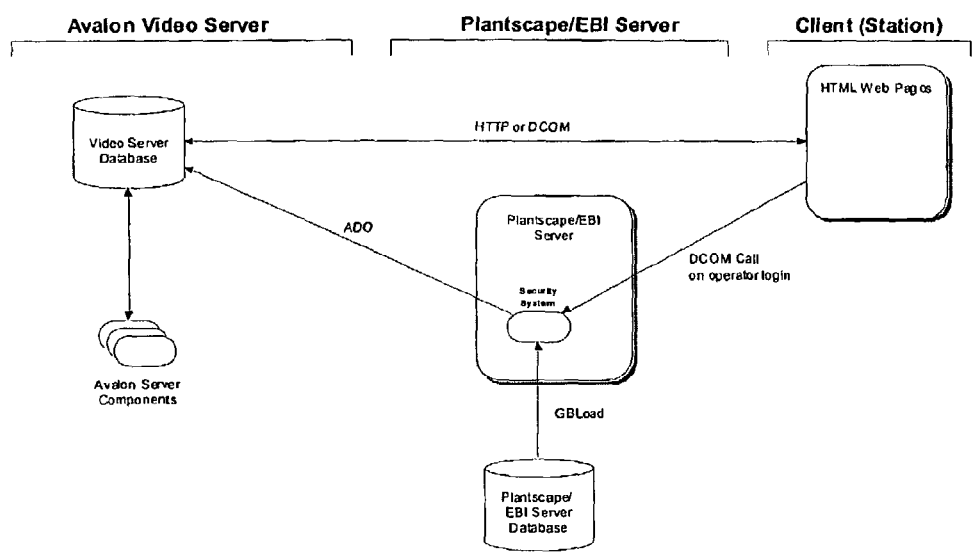
FIG. 40 is a block diagram illustrating the Security System Interface.

Security System Interface. The security system is implemented as a COM object residing in the EBI/Plantscape server machine. Client machines communicate with it via DCOM as shown in FIG. 40.

Before a web page is loaded, the security settings of the user that logged into the Plantscape/EBI machine are firstly investigated. The station number is sent to the video server when the web page is processed. Server side scripts create business objects on the server machine which in turn checks the security settings. This is done by querying a local copy of the area assignment information stored in the Avalon database. This information is updated each time a user logs into a client machine by a call to the security object in the OnOperatorChange script on the client machine.

The tables which the Security system accesses on the Plantscape/EBI server are:
(a) Area Assignment Table—for list of available areas and their description;
(b) CRT Table—used to obtain the operator number from a given station number; and
(c) Operator Table—used to obtain the security level and control level for an operator.

Each of the elements of the present invention are preferably implemented using the following Platforms and software:
Video Server:
(a) NT 5.x Server;
(b) SQL Server 7; and
(c) IIS.
Client: The client is preferably a workstation with the following software installed:
(a) Windows NT 4.0 SP5;
(b) Windows 98;
(c) Internet Explorer 5; and
(d) Station Release 320.

PlantScape Server. The PlantScape Server is based on PlantScape Release 300.

EBI Server. The EBI Server is based on EBI Release Bronte.

The following paragraphs provide a further detailed description of the preferred embodiment of the present invention.

Video Integration Functionality. The following paragraphs describe the video integration functions which the invention performs.

The video integration functionality is preferably implemented through a HMI running on a client PC. The Client PC is connected to both the video server and a PlantScape/EBI server.

The video integration functionality can be divided into:
(a) Live video; and
(b) Recorded video.

The list of cameras and functions available to a user is dependent on the security privileges assigned to that user by the PlantScape/EBI system. All users must first connect to either a PlantScape or EBI server before being allowed access to the to video integration HMI.

The HMI preferably operates within the standard Honeywell Station Release 320 environment. To support the video HMI the station preferably:
(a) Uses the SafeBrowse feature of Station; and
(b) Includes a feature to ensure that the operator station does not timeout if the operator is viewing one of the live or recorded video pages.

Live Video. The live output from cameras can be viewed through a series of displays. These support:
(a) Single camera view;
(b) Modifying settings for a camera;
(c) Modify recording arrangements for a camera;
(d) Group view of up to four cameras; and
(e) Adding and deleting cameras.

Users can select a camera from a tree control listing the cameras available to the user.

FIG. 6 is a screen dump of a sample client display screen showing a frame captured from a single camera and displayed on a client. The key features of this display are:
(a) Navigation panel linking to other Avalon functionality;
(b) Title bar showing the camera name and description;
(c) Tabs for live output, settings, recording and schedule details;
(d) A video object displaying live camera output;
(e) A list of preset positions (if the camera type supports this functionality). Selecting one of these positions will cause the camera to automatically carry out the necessary PTZ motions to show the position;
(f) The ability to define preset positions. The preset position has a 20-character description;
(g) Details of any other user currently in control of the camera (and how much longer they will have control). Users of higher security levels are able to take control of the camera at any time (if relevant this is also indicated);
(h) Current recording details are shown. If the camera is being recorded this is indicated along with the reason for recording, and the time remaining for the current recording to complete;
(i) A "Recent Recordings" tab takes the user to a search page listing the last 24 hours of video recorded on this camera; and
(j) "Disable" checkbox. This will stop all video output from the camera as well as any video recording. This checkbox can be toggled to enable/disable the camera stream.

This display allows the user to:
(a) View the live output from the selected camera;
(b) Pan, tilt, zoom and focus the camera using a joystick attached to the client PC;
(c) Pan, tilt, zoom and focus the camera using a pointing device attached to the client PC. Standard Windows pointing devices such as a mouse or touch-screen are supported;
(d) Manually record a segment of live video. Recording will continue for the configured period of. Once recording has begun a button to stop is highlighted as well as a counter showing the recording time remaining; and
(e) Manually record a snapshot (single frame) from the live video.

Figures 41, 42:
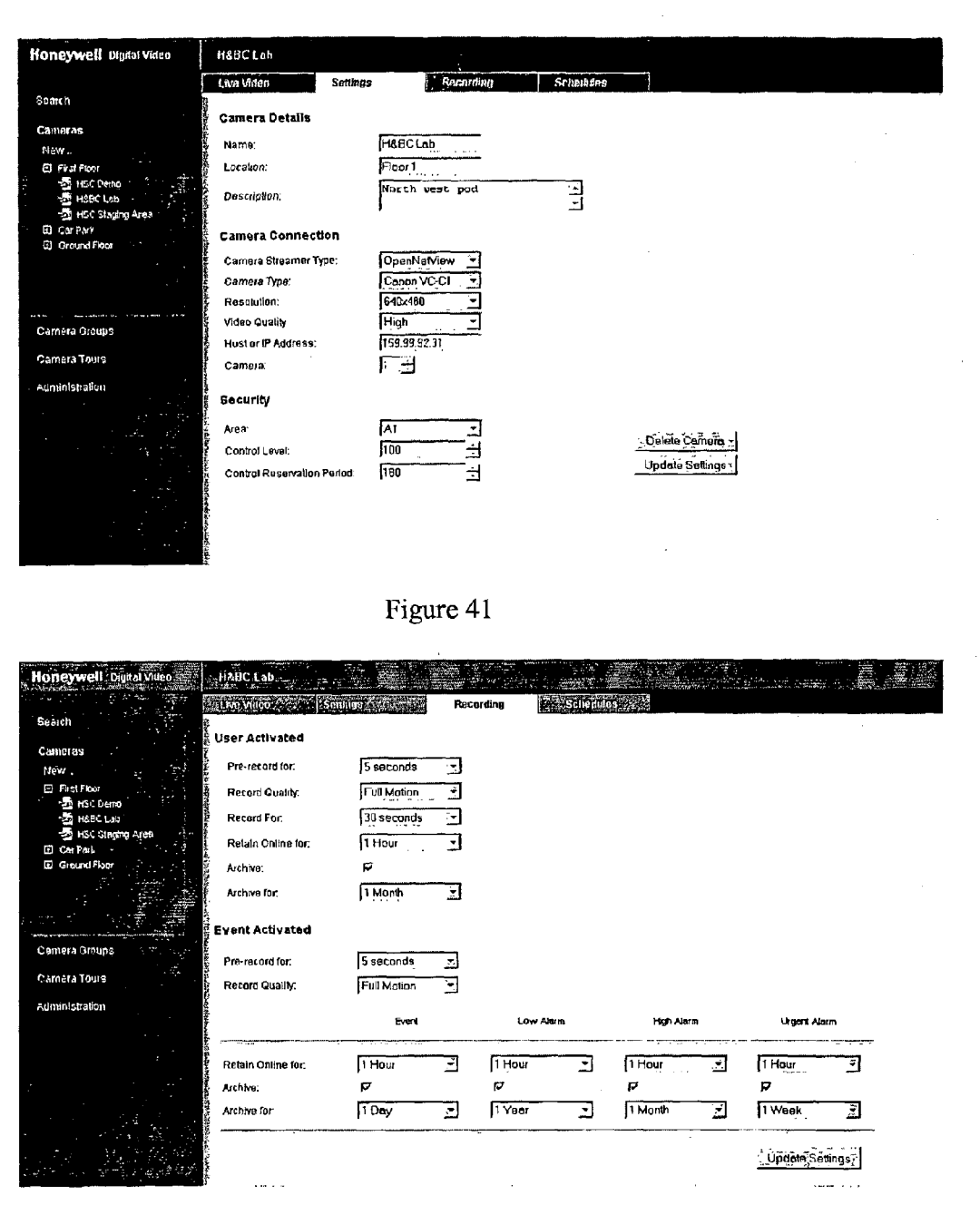

Camera settings. FIG. 41 is a screen dump of a sample client display screen showing the live video settings of the preferred embodiment. From this display users can change important settings for an individual camera. The details are grouped into several sections:

(a) Camera Details;

(b) Camera Connection;

(c) Security; and (d) Delete Camera.

Preferably, only users with the highest level of security (MNGR) are permitted to modify camera connection details or delete cameras.

Camera Details:

| | |
|---|---|
| Name | A unique name for the camera up to 16 alphanumeric (a to z, A to Z, and 0 to 9) characters in length. The name should contain at least one alpha character. Spaces, tabs and commas are not valid characters. Note: a camera is not a PlantScape/EBI point. Sixteen character point names match the capability of PlantScape EBI. |
| Location | Used by the camera list panel portion of this and other displays to group cameras by location. |
| Description | A 255 alphanumeric character description. |
| Camera Connection: | |
| Camera Streamer Type | Specify the type of Camera Streamer used to connect the camera to the network. The following camera streamer types are supported:<br>OpennetView<br>Axis 2400<br>Axis 2401<br>Prism LAN Camera (stretch goal) |
| Camera Type | The type of camera connected to the camera streamer. At least the following camera types are supported:<br>Pelco Spectra-dome (PTZ capable)<br>Canon VC-C3 (PTZ capable)<br>Fixed (no PTZ capability) |
| Resolution | Determines the resolution at which the camera output is viewed and stored. The available options are:<br>640 by 480 pixels<br>320 by 240 pixels<br>160 by 120 pixels<br>Some camera streamer types do not support all of the listed resolutions. The video server can only support those resolutions offered by the camera streamer. |
| Video Quality | Determines the frame rate of video displayed on the Live page. The supported rates (in frames per second) are:<br>30<br>25<br>20<br>15<br>10<br>7<br>5<br>3<br>2<br>1<br>½<br>⅓<br>¼<br>⅕ |
| Host or IP Address | Each Camera Streamer has an IP address. The Video Server uses the IP address to connect to the Camera Streamer. Changing this value does not change the value in the Camera Streamer (note: The camera streamer IP must be set using the manufacturer instructions). The address can either be entered as the raw IP address or as a host name (associated with an IP address through standard Windows functionality) |
| Camera Number | Enter the required position of the video input on the Camera Streamer if the Camera Streamer supports multiple camera connections. For example the Axis 2400 has 4 camera positions |
| Security: | |
| Area | PlantScape/EBI area. Used by PlantScape/EBI to determine operator security privileges. Allows the system to be configured to only allow users to view specified-cameras. Refer to PlantScape/EBI documentation for details. |
| Control Level | PlantScape/EBI control level. Used by PlantScape/EBI to determine operator security privileges. Determines if a user is allowed to operate the PTZ controls for a camera. Also used to allow higher level users to take control of cameras. Refer to PlantScape/EBI documentation for details. |
| Control Reservation Period | Once a particular user has controlled the camera no other user can control the camera until this reservation period has expired. If this user controls the camera again within the period, the reservation period is reset. Users with higher security permissions can take control of the camera at any time. |

Delete:

The "Delete" icon allows a user with MNGR level security to delete the camera from the Video Server. Deleting a camera will delete the record relating to the camera from the database. The name of the camera will no longer appear in the list of cameras. All camera settings is deleted.

The user is asked if they also wish to delete video clips captured for the camera. The default action is to not delete the video clips. If the video clips are not deleted they will stay on the video server and archives unless they are later individually deleted. The camera name will also continue to appear in the list of cameras used for searching the video clip database.

If the user chooses to delete video clips captured for the deleted camera, all video clips related to the is deleted. The camera name is removed from the list of cameras used for searching the video clip database.

Recording. The Camera Recording Details screen, shown in FIG. 42 is used to configure the following recording requirements for the camera:

(a) User activated; and (b) Event activated.

| | |
|---|---|
| User Activated | This section defines parameters particular to user-initiated video recording. The user can initiate video recording by viewing live video and selecting the "Record" icon. |
| Pre-Record For | The amount of pre-recorded video that is associated with a user request for recorded video. This will allow the Video Server to capture video prior to the user request, as well as after the request. |
| Frame Rate | Video quality required for user activated recording |
| Record For | User activated recordings will terminate after this period. The user can choose to extend the individual recording at any time by pressing the "record" button during a recording. This will cause the timeout counter (indicating how long till the end of the recording) to be reset to the timeout period. |
| Retention Period | The period that user activated recording is retained by the video server before being deleted. The retention period of individual clips can be changed from the "Search Results" page. |
| Event Activated | This section defines parameters particular to alarm/event triggered video recording. The following settings are specified for the four priorities of events/alarms:<br>(a) Event (journal priority);<br>(b) Low priority alarms; |

| | |
|---|---|
| | (c) High priority alarms; and |
| | (d) Urgent priority alarms. |
| | Note that these following parameters define the maximum possible recording parameters for an alarm/event. For example a camera may allow pre-recording for events but an individual event on the PlantScape/EBI point event may only require a snapshot. |
| Pre-Record For | The maximum amount of pre-recorded video that can be associated with an alarm/event. This will allow PlantScape/EBI events to capture associated video prior to the event, as well as after the event. This is the maximum amount of pre-alarm recording available to all priorities Individual alarms may be configured to use lesser amounts (or snapshots) of video. |
| Frame Rate | Video quality required. All priorities will use the same quality settin (unless the individual event requests a snapshot). |
| Retention period | How long the recording is retained by the video server before being deleted. Possible selections are:<br>(a) 1 day;<br>(b) 2 days;<br>(c) 3 days;<br>(d) 1 week;<br>(e) 2 weeks;<br>(f) 1 month;<br>(g) 3 months;<br>(h) 6 months;<br>(i) 1 year; or<br>(j) forever. |

Figure 43:
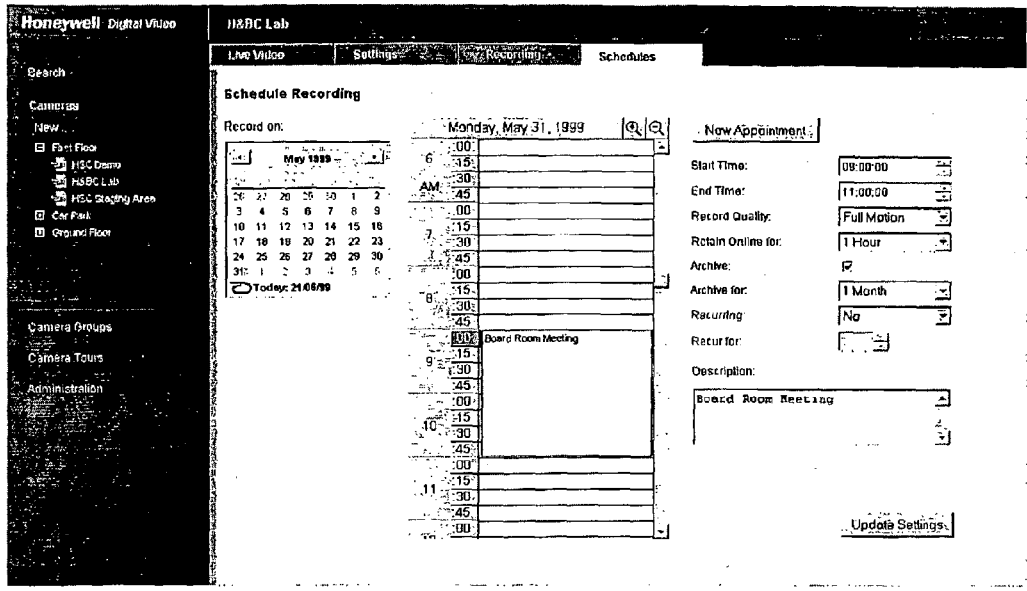
FIG. 43 is a screen dump of a sample client display screen showing the Recording Schedule Configuration of the preferred embodiment.

Schedules. FIG. 43 is a screen dump of a sample client display screen showing the Recording Schedule Configuration of the preferred embodiment. This page is used to configure scheduled recordings for the camera.

| | |
|---|---|
| Scheduled Recording | A calendar and time control is shown. The user can select a time period for a specific day. This will activate a recording on that particular day. The user is prompted to type in details of the request as well as the recording quality. The user can also specify if this is a recurring schedule. Start and stop times can be defined to the minute boundary (e.g. 12:48).<br>For each scheduled recording the user can select:<br>(a) Start;<br>(b) Stop;<br>(c) Frame rate;<br>(d) Retention period;<br>(e) Recurrence; and/or<br>(f) Description (255 characters).<br>Zoom in and out buttons can be used to alter the displayed time control resolution. |

Add a new camera. FIG. 44 is a screen dump of a sample client display screen showing the Add a New Camera screen of the preferred embodiment. Using this display, users can add new cameras to the Avalon Video Server. The functionality of fields on this display is listed in the camera setting section.

Recorded Video. Camera output can be recorded for the following reasons:
(a) Activated by a PlantScape/EBI alarm or event;
(b) Manually activated by a user viewing a live camera; or
(c) Scheduled recording.

Event activated recording is a process that allows a segment of video or a snapshot to be associated with a PlantScape/EBI alarm or event.

User activated recording occurs when a user viewing the "Live Video" page chooses to record the currently viewed camera output by selecting the "Record" button.

Scheduled recording allows video to be recorded between start and stop times on defined days.

Recorded video is stored on the Video Server. The Avalon HMI is able to query the Video Server to locate relevant recorded video and to then replay that video.

Figure 45:
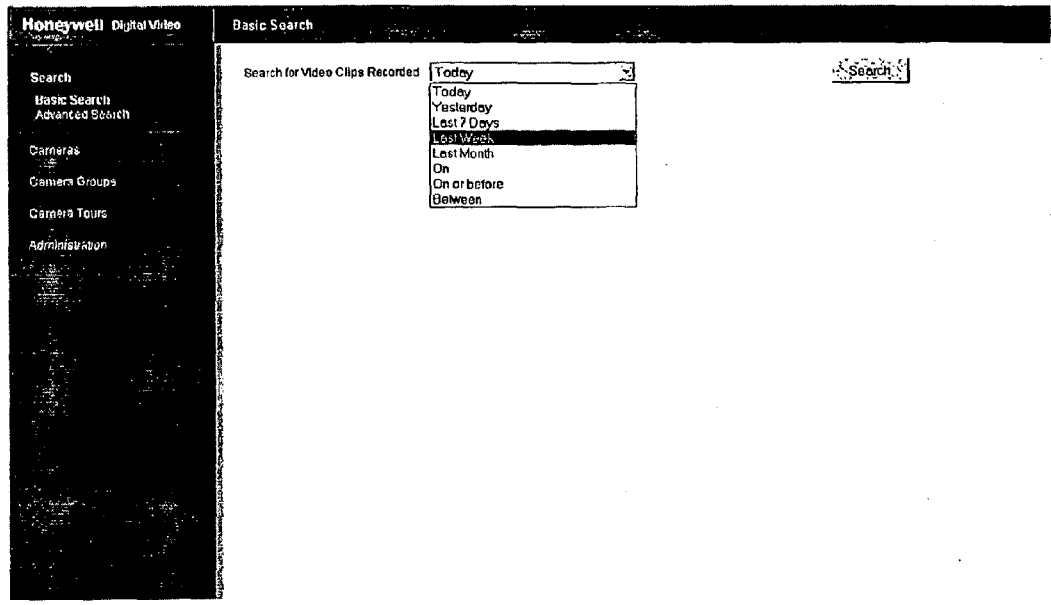
FIG. 45 is a screen dump of a sample client display screen showing the Basic Search Of Recorded Video screen of the preferred embodiment.
Figure 47:
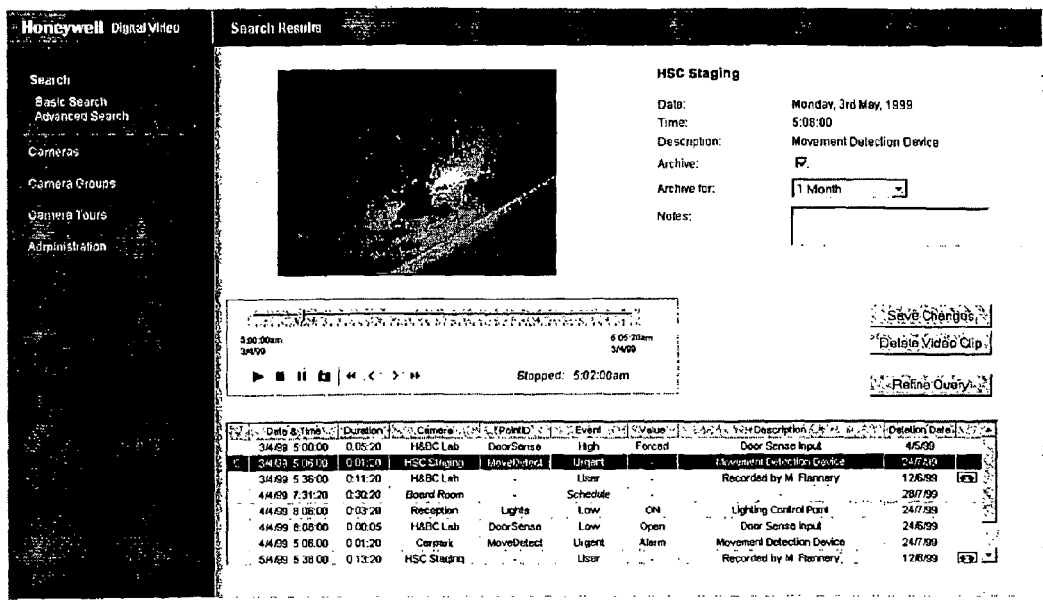
FIG. 47 is a screen dump of a sample client display screen showing the Search Results screen of the preferred embodiment.

Search. The display shown in FIG. 45 allows a simple search of all video recorded on the Video Server. The user selects the time indicator which shows a calendar and time line. The user selects the required search period.

Once the time criterion is entered the "search" is selected. Video recorded during the selected period is returned by the search.

The user can search on combinations of cameras by clicking on the "Advanced Search" icon as disclosed below.

Figure 46:
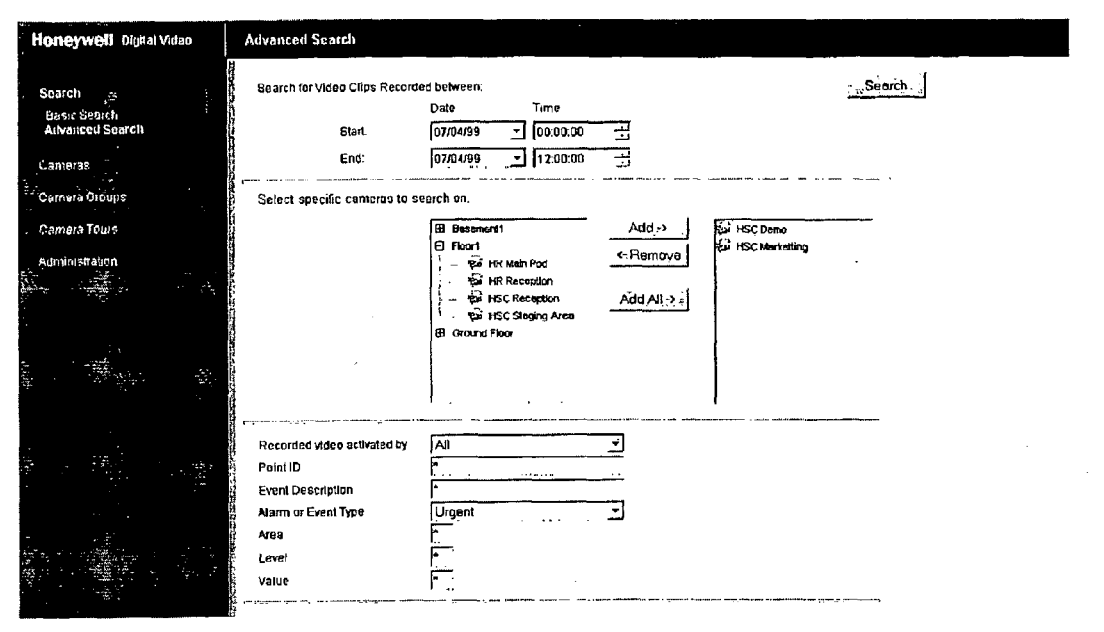

Advanced Search. FIG. 46 is a screen dump of a sample client display screen showing the Advanced Search Of Recorded Video screen of the preferred embodiment. This display allows for an advanced search of recorded video. The search is based on time and recording.

The user can select from the list of cameras on the video server. It also includes any cameras that have been deleted from the video server but still have video stored on the video server or on archived media. If a camera has been deleted and all video associated with the camera has been deleted, the camera name will not appear in this list.

The time criterion is selected from a calendar and time line control. Days containing recorded video are shown in bold on the calendar control. Cameras can be added and removed from the search list.

The user can choose to filter the search based on the following criteria:
(a) Alarm or event type;
(b) Recording type (schedule, event, operator, all);
(c) Area;
(d) Point name;
(e) Event description; or
(f) Operator name.

Wildcards are accepted for the Point ID, description, area, level and value.

Selecting the "Search" button will start the search. The results are shown in following section.

Search Results. FIG. 55 is a screen dump of a sample client display screen showing the Search Results screen of the preferred embodiment. This page shows the results of the basic and advanced searches. If the user has accessed this page from the "Recent Recordings" button on the Live Video page then the results will list recordings on a single camera in the last 24 hours (FIG. 3.2.2.3-2).

The user is able to select columns within the list of selected events to sort the output.

The following features appear on this page:

| | |
|---|---|
| Video Player | Shows the recorded video segment. |
| Clip Details | Lists all events relevant to the selected time window. As the slide bar moves along the time line a cursor will highlight any current alarms and events. |
| ▶ Play | Will cause the video clip referenced in the Selected Video Clip box to play from the current slide bar position. |
| ■ Stop | Will terminate playing and move the slide bar position to the start of the video clip. |
| ▮▮ Pause | Will halt playing of the current video clip. Subsequently selecting the Play button will commence playing from the current position. |
| ▶ Step Forward | Can be used once the stop or pause buttons have been selected. Will cause the displayed video to be advanced one frame. |

-continued

| | |
|---|---|
| ▷ Step Backward | Can be used once the stop or pause buttons have been selected. Will cause the displayed video to move back one frame. |
| ▶ Fast Forward | Play the video at an accelerated rate (in general five times the normal speed, while only displaying every fifth frame) in the backward direction. |
| ▶ Fast Backward | Play the video at an accelerated rate (in general five times the normal speed, while only displaying every fifth frame) in the forward direction. |
| The following fields appear in the event detail box: | |
| Date/Time | Date and time of the event. This is the time at which the event was recorded on the PlantScape/EBI server. |
| Duration | The total time from pre-alarm to post-alarm during which video was recorded for this event. Snapshots is listed as 0 seconds. |
| Alarm/Event | Alarm or Event and the priority. |
| Point ID | The name of the PlantScape/EBI point that triggered the event capture |
| Description | The alarm line description from PlantScape/EBI. |
| Value | The value associated with the alarm/event (e.g. FAIL) |
| Deletion Date | The date this video clip is automatically deleted from the system. |
| The following button also appears on the screen: | |
| Delete | This icon allows a MNGR level user to delete the video clip from the Video Server database. Deletion means that all references to the video clip are removed and subsequent searches will not find reference to the clip. |

Note:
The page contains a note section. This will show the notes for the selected event. The user can edit the notes to add additional comments. The notes for scheduled recording will also be shown and can also be edited.

Alarm/Event Based Video Recording and Monitor Switching. PlantScape/EBI events and alarms can trigger video recording and automatically switch camera output to specified monitors. This version of Avalon will rely on host based activation using the existing algorithm structure.

The following PlantScape/EBI point types can generate alarms and events that can trigger video capture in the Video Server and switch monitors:
(a) Analogue (in one embodiment alarms are mapped to Status points);
(b) Status;
(c) Accumulator (in one embodiment alarms are mapped to Status points);
(d) Access; and
(e) CDA (in one embodiment alarms are mapped to Status points).

Event Triggered Recording—Algorithm Version. This version uses the queued task request algorithms. These can be activated from any state of a PlantScape/EBI point and are described in detail in the PlantScape/EBI documentation. The following information can be entered for each point with the algorithm attached:
(a) Activation states;
(b) Capture snapshots or video;
(c) If video capture then;
(d) Pre-alarm record time;
(e) Post-alarm record time; and
(f) Station or area number if automatic display on a monitor is required (similar to the Status Change Display Request algorithm).

The algorithm enters an event in the Event Summary indicating that video is being captured on the video server.

Figure 7:
FIG. 7 shows the display screen of FIG. 6 showing multiple frame captures from multiple cameras.

Quad Camera View. A camera group consists of up to four related cameras viewed on a single display. FIG. 7 shows the display screen of FIG. 6 showing multiple frame captures from multiple cameras;

The quad camera view is divided into four quadrants. For each quadrant the view can have a camera or be blank. Within each quadrant the view can be configured to cycle between a number of cameras.

Figure 48:
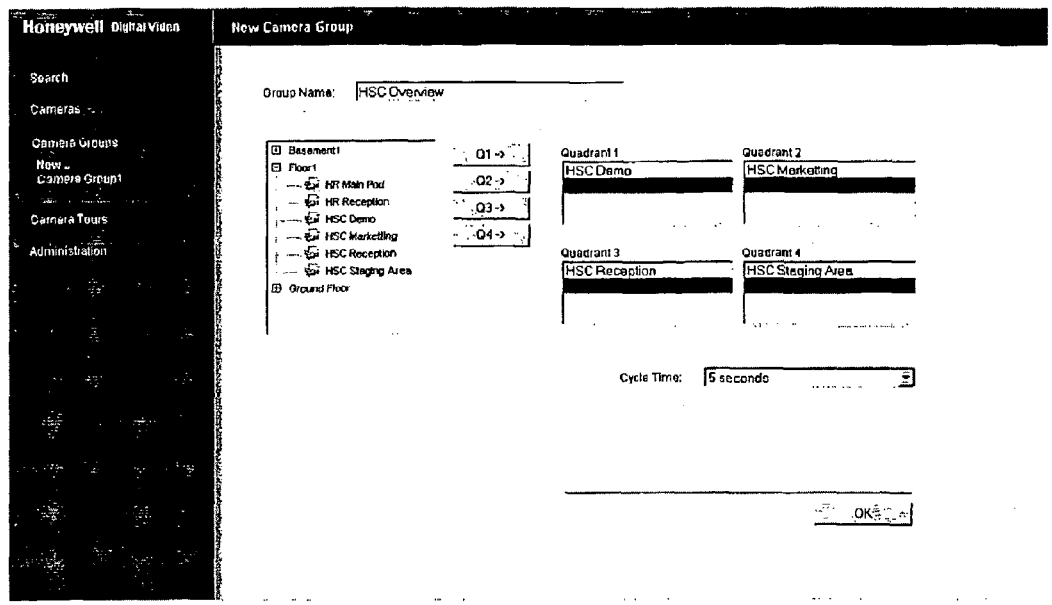
FIG. 48 is a screen dump of a sample client display screen showing the Camera Group Settings screen of the preferred embodiment.

Configuring a Camera Group. FIG. 48 is a screen dump of a sample client display screen showing the Camera Group Settings screen of the preferred embodiment.

Quad View Name. A unique name for the quad camera view up to 16 alphanumeric (a to z, A to Z, and 0 to 9) characters in length. The name should contain at least one alpha character. Spaces, tabs and commas are not valid characters.

Camera List. A list of all the cameras on the system (based on the user's security details). The user selects a camera name and then adds it to one of the quadrants. If more than one camera is placed in a quadrant then the display will cycle between the cameras in the list at the configured "Cycle Time".

Decompressing and playing video requires substantial CPU processing resources. For this reason the ability to support multiple video streams on a single page has been limited, in this preferred embodiment, to a maximum of four cameras.

User Audit Trail. It is a requirement of high security sites that all user actions on the Avalon HMI be recorded in a log file as well as the PlantScape/EBI event file. User actions include:
(a) Interventions such as manual recording and changing settings;
(b) Display pages visited; and
(c) Video clip replays.

The log of user actions shall be available in text format on the video server. The log file preferably uses the same method as the PlantScape log file (i.e. loga and logb files).

Viewing Cameras from PlantScape/EBI Custom Schematics. Displays on PlantScape/EBI clients are built using Display Builder. The Display Builder SafeBrowse object can be used to place web pages in displays.

Every time changes to the camera settings are made, the video server will create a web page containing the live output of the camera. The SafeBrowse object can access this web page. A page shall also be available to support PTZ controls via a mouse on the custom display.

Performance. The following paragraphs describe the performance levels achieved by the present invention.

The following figures present a guide to the expected disk space and bandwidth usage for a single camera connected to an Avalon server. These can be extrapolated linearly for multiple cameras.

The practical capacity of an Avalon server appear to be approximately:
(a) Network bandwidth of 60 Mbits per second; and
(b) Disk writing of 1 Mbytes per second.

The present invention, at least in its preferred forms, provides a novel mechanism for using a computer communications network, such as a LAN or WAN, to stream video signals between cameras and computer clients requiring that video. In the preferred form, the use of event triggering to push a video stream to an interested client computer provides a flexible, powerful tool for security and process control applications, especially when used in an integrated security and process control network environment. For these reasons, the invention provides a commercially significant improvement over prior art systems.

The invention claimed is:
1. A digital video management system for remote live video monitoring of one or more areas or processes of interest, the system including:

a plurality of cameras, each camera having a respective camera streamer configured to packetize the camera output and to provide live first video signals to a computer communications network;

a schedule manager configured to periodically poll a database thereby to cache a list of record requests thereby to determine a schedule;

a plurality of video servers configured for linking to the network, wherein each video server is configured to receive the first video signals from an associated one or more cameras, and configured to be responsive to the determined schedule for storing, according to the determined schedule, on storage media associated with the server at least some of the first video signals from the associated one or more cameras, wherein each server is further configured to selectively access the stored signals and/or the first video signals to provide second video signals;

at least one client computer terminal configured for linking to the network, the client computer terminal being configured for requesting, receiving and displaying to an operator the second video signals received over the computer communications network, including playback of stored video signals for allowing the operator to review past events, and live video signals for allowing the operator to view events live wherein the client computer terminal is additionally configured for providing scheduled record requests; and wherein, in response to a request from the client computer terminal for live video signals from a selected camera, the video server associated with the selected camera is configured for providing the requested live video signals to the computer communications network, wherein the live video signals are addressed to the client computer terminal which issued the request, wherein providing the requested live video signals includes receiving video frames from the camera streamer and re-broadcasting those video frames independent of those frames being stored on storage media.

2. A system according to claim 1 wherein the determined schedule includes a plurality of time based trigger points and the server stores the first video signals starting at a first predetermined period prior to each point and a second predetermined period after each point.

3. A system according to claim 2 wherein the first and the second predetermined periods are configurable based upon one or more of: on a per camera basis; on a per area basis; on an event type basis.

4. A system according to claim 2 wherein the duration of the first and the second predetermined periods are configurable.

5. A system according to claim 1 wherein the determined schedule includes a plurality of event based trigger points and the server stores the first video signals starting at a first predetermined period prior to each point and a second predetermined period after each point.

6. A system according to claim 5 including a sensor for providing a third signal to the network, wherein one of the event based trigger points comprises the third signal falling within a predetermined range.

7. A system according to claim 1 including a plurality of client terminals and a controller for controlling the signals that are provided to respective terminals.

8. A system according to claim 7 wherein the terminals provide over the network respective camera control commands to the video server and the video server processes those commands and generates control signals that are sent to the relevant camera via the network.

9. A system according to claim 8 wherein the processing of the commands by the video server includes a determination of whether or not the terminal sending the respective command has access rights to the relevant camera.

10. A system according to claim 9, wherein the controller is adapted to receive camera control functionality requests from the terminals and to forward camera control commands to the cameras.

11. A system according to claim 10, wherein the controller is adapted to deny a control functionality request relating to a camera being controller by another terminal.

12. A system according to claim 10, wherein the controller is adapted to grant or deny a control request in dependence upon security level information relating to a user making the request.

13. A system according to claim 1, wherein the first video signals are compressed by the cameras.

14. A system according to claim 1, wherein the camera streamers compress the respective first video signals.

15. A system according to claim 1, wherein the live video signals are provided encoded to give priority to the video stream over the audio stream to emphasize coherency of the video stream.

* * * * *